(12) United States Patent
Berman et al.

(10) Patent No.: US 11,944,222 B2
(45) Date of Patent: Apr. 2, 2024

(54) ADJUSTABLE ROD FEATURES

(71) Applicant: House of Atlas, LLC, Evanston, IL (US)

(72) Inventors: Matthew Berman, Chicago, IL (US); Alan Arthur Ford, Sturgis, MI (US); Jason Moss, Libertyville, IL (US)

(73) Assignee: House of Atlas, LLC, Evanston, IL (US)

( * ) Notice: Subject to any disclaimer, the term of this patent is extended or adjusted under 35 U.S.C. 154(b) by 0 days.

(21) Appl. No.: 17/702,447

(22) Filed: Mar. 23, 2022

(65) Prior Publication Data

US 2022/0265075 A1 Aug. 25, 2022

Related U.S. Application Data

(63) Continuation of application No. 16/943,282, filed on Jul. 30, 2020, now Pat. No. 11,382,447.

(60) Provisional application No. 62/880,483, filed on Jul. 30, 2019.

(51) Int. Cl.
  *A47H 1/022* (2006.01)
  *F16B 7/14* (2006.01)
  *A47H 1/02* (2006.01)

(52) U.S. Cl.
  CPC ........... *A47H 1/022* (2013.01); *F16B 7/1463* (2013.01); *A47H 2001/0215* (2013.01)

(58) Field of Classification Search
  CPC ............ A47H 1/022; A47H 2001/0215; F16B 7/1463; F16B 33/006
  See application file for complete search history.

(56) References Cited

U.S. PATENT DOCUMENTS

| | | |
|---|---|---|
| 424,610 A | 4/1890 | Laurence |
| 453,631 A | 6/1891 | Farley |
| 468,987 A | 2/1892 | Henry |
| 519,840 A | 5/1894 | Edsall |
| 666,467 A | 1/1901 | Clark |
| 938,883 A | 11/1909 | Maier |
| 961,352 A | 6/1910 | Walters |
| 1,062,478 A | 5/1913 | Kroder |
| 1,374,026 A | 4/1921 | Nelson |
| 1,401,727 A | 12/1921 | Pimlott |
| 1,425,247 A | 8/1922 | Galbreath |

(Continued)

FOREIGN PATENT DOCUMENTS

| | | |
|---|---|---|
| CH | 625601 | 9/1981 |
| DE | 327136 | 10/1920 |

(Continued)

OTHER PUBLICATIONS

Artika Shower Caddy - Odyssey 2 Instruction Manual (PO-22046), Publicly available for purchase before May 18, 2020, 5 pages.

(Continued)

*Primary Examiner* — Stanton L Krycinski
(74) *Attorney, Agent, or Firm* — Fitch, Even, Tabin & Flannery LLP

(57) ABSTRACT

There is provided a lock mechanism for an adjustable rod. The lock mechanism provides a manually locking state and an automatic locking state. The automatic locking state provides a more secure locking engagement than the manual locking state. There is also provided improved end cap systems that minimize the number of components.

17 Claims, 22 Drawing Sheets

(56) References Cited

U.S. PATENT DOCUMENTS

| | | |
|---|---|---|
| 1,679,881 A | 10/1925 | Simpson |
| 1,639,551 A | 8/1927 | Booth |
| 1,742,164 A | 12/1929 | Berke |
| 1,756,716 A | 4/1930 | Whitney |
| 1,837,340 A | 12/1931 | Schwartz |
| 1,910,555 A | 5/1933 | Marlowe |
| 1,951,660 A | 3/1934 | Klaudt |
| 2,032,842 A | 3/1936 | Gould |
| 2,199,851 A | 5/1940 | Culver |
| 2,275,330 A | 3/1942 | Tveten |
| 2,293,168 A | 8/1942 | Pirone |
| 2,355,489 A | 8/1944 | Waddell |
| 2,490,369 A | 12/1949 | Neuwirth |
| 2,508,039 A | 5/1950 | Neuwirth |
| 2,542,967 A | 2/1951 | Waechter |
| 2,637,555 A | 5/1953 | Klaudt |
| 2,643,143 A | 6/1953 | Bergqvist |
| 2,661,850 A | 12/1953 | Fowler et al. |
| 2,695,800 A | 11/1954 | Soucy |
| 2,696,963 A | 12/1954 | Shepherd |
| 2,716,533 A | 8/1955 | Freeman |
| 2,840,402 A | 6/1958 | Hassel |
| 2,903,141 A | 9/1959 | Seewack |
| 2,935,299 A | 5/1960 | Jansen |
| 2,947,556 A * | 8/1960 | Wenger ............... F16B 7/1463 248/161 |
| 2,974,806 A | 3/1961 | Seewack |
| 2,999,706 A | 9/1961 | Wilcox |
| 3,004,743 A | 10/1961 | Wenger |
| 3,031,215 A | 4/1962 | Vance |
| 3,040,902 A | 6/1962 | Dunn |
| 3,083,041 A | 3/1963 | Owenmark |
| 3,098,669 A | 7/1963 | Fortin |
| 3,227,113 A | 1/1966 | Kupski |
| 3,333,808 A | 8/1967 | Philip |
| 3,424,111 A | 1/1969 | Maslow |
| 3,515,417 A | 6/1970 | Bowman |
| 3,559,352 A | 2/1971 | Magnuson |
| 3,560,032 A | 2/1971 | Cohen et al. |
| 3,572,511 A | 3/1971 | Triplett |
| 3,633,862 A | 1/1972 | Breen |
| 3,674,294 A | 7/1972 | Kirkham |
| 3,788,489 A | 1/1974 | Levinthal |
| 3,809,142 A | 5/1974 | Bleeker |
| 3,851,601 A | 12/1974 | Davis |
| 3,932,048 A | 1/1976 | Dupont |
| 3,951,269 A | 4/1976 | Anderson |
| 3,961,822 A | 6/1976 | Daniel |
| 4,024,686 A | 5/1977 | Gronert |
| 4,128,064 A | 12/1978 | Chung |
| 4,134,703 A | 1/1979 | Hinners |
| 4,248,418 A | 2/1981 | Friedberg |
| 4,390,099 A | 6/1983 | Trautlein |
| 4,405,111 A | 9/1983 | Lennon |
| 4,419,026 A | 12/1983 | Leto |
| 4,422,794 A | 12/1983 | Deken |
| 4,506,477 A | 3/1985 | Castle |
| 4,629,207 A | 12/1986 | Shiflet |
| 4,636,106 A | 1/1987 | Waisbrod |
| 4,653,714 A | 3/1987 | Andrasko, Jr. |
| 4,700,918 A | 10/1987 | Andrasko, Jr. |
| 4,757,641 A | 7/1988 | Penrod |
| 4,765,001 A | 8/1988 | Smith |
| 4,856,929 A | 8/1989 | Smahlik |
| 4,895,471 A * | 1/1990 | Geltz .................. F16B 7/14 403/109.8 |
| 4,991,344 A | 2/1991 | Carney |
| 4,998,731 A | 3/1991 | Bowen |
| 5,022,104 A | 6/1991 | Miller |
| 5,054,624 A | 10/1991 | Camp |
| D324,328 S | 3/1992 | Pagan |
| 5,094,418 A | 3/1992 | Mcbarnes, Jr. |
| D327,421 S | 6/1992 | Pagan |
| 5,156,281 A | 10/1992 | Schwartz |
| 5,242,065 A | 9/1993 | Hoban |
| 5,259,520 A | 11/1993 | Roggio |
| 5,303,832 A | 4/1994 | Tu |
| 5,317,855 A | 6/1994 | De Leeuw |
| 5,330,061 A | 7/1994 | Geltz |
| 5,333,665 A | 8/1994 | Safar |
| 5,433,551 A | 7/1995 | Gordon |
| 5,549,407 A | 8/1996 | Levi |
| 5,615,721 A | 4/1997 | Winter |
| 5,653,057 A | 8/1997 | Gary |
| 5,678,703 A | 10/1997 | Sawyer |
| 5,681,017 A | 10/1997 | Clausen |
| 5,702,010 A | 12/1997 | Liang |
| 5,758,545 A | 6/1998 | Fevre |
| D398,468 S | 9/1998 | Yemini |
| 5,803,643 A | 9/1998 | Patelli |
| 5,826,847 A | 10/1998 | Warner |
| 5,881,653 A | 3/1999 | Pfister |
| 5,894,610 A | 4/1999 | Winter |
| 5,964,444 A | 10/1999 | Guertler |
| 5,996,674 A | 12/1999 | Gatewood |
| 5,996,791 A | 12/1999 | Bibby |
| 6,010,017 A | 1/2000 | Michaelis |
| D421,692 S | 3/2000 | Wojtowicz |
| 6,062,149 A | 5/2000 | Duvivier |
| D429,934 S | 8/2000 | Hofman |
| 6,213,437 B1 | 4/2001 | Robbins |
| D443,162 S | 6/2001 | Winter |
| D443,813 S | 6/2001 | Harwanko |
| 6,250,839 B1 | 6/2001 | Lenhart |
| 6,286,282 B1 | 9/2001 | Castano |
| D450,947 S | 11/2001 | Walker |
| 6,354,629 B1 | 3/2002 | Mcneal |
| D456,167 S | 4/2002 | Harwanko |
| 6,443,207 B1 | 9/2002 | Cheng |
| 6,467,989 B1 | 10/2002 | Finkelstein |
| D466,798 S | 12/2002 | Rebman |
| D466,799 S | 12/2002 | Suero, Jr. |
| D470,332 S | 2/2003 | Clucas |
| 6,520,351 B1 | 2/2003 | Zadro |
| D472,453 S | 4/2003 | Rebman |
| 6,543,629 B1 | 4/2003 | Samelson |
| D475,551 S | 6/2003 | Kelso |
| D475,561 S | 6/2003 | Suero, Jr. |
| D475,562 S | 6/2003 | Suero, Jr. |
| 6,575,316 B2 | 6/2003 | Lin |
| 6,581,790 B1 | 6/2003 | Zadro |
| 6,637,364 B1 | 10/2003 | Campeau |
| 6,640,867 B1 | 11/2003 | Pallotta |
| 6,651,831 B2 | 11/2003 | Samelson |
| D483,251 S | 12/2003 | Suero, Jr. |
| 6,681,831 B1 | 1/2004 | Cheng |
| D491,448 S | 6/2004 | Rebman |
| 6,761,202 B1 | 7/2004 | Cheng |
| D494,052 S | 8/2004 | Winter |
| D494,455 S | 8/2004 | Winter |
| D494,845 S | 8/2004 | Winter |
| 6,823,925 B2 | 11/2004 | Militello |
| 6,824,000 B2 | 11/2004 | Samelson |
| D499,329 S | 12/2004 | Suero, Jr. |
| D500,670 S | 1/2005 | Rebman |
| 6,845,955 B1 | 1/2005 | Hsu |
| D501,737 S | 2/2005 | Clucas |
| D501,738 S | 2/2005 | Clucas |
| 6,862,776 B2 | 3/2005 | Chen |
| 6,865,817 B2 | 3/2005 | Militello |
| D504,310 S | 4/2005 | Harwanko |
| D504,807 S | 5/2005 | Harwanko |
| D505,062 S | 5/2005 | Suero, Jr. |
| D505,317 S | 5/2005 | Harwanko |
| D507,129 S | 7/2005 | Harwanko |
| 6,948,545 B1 | 9/2005 | Cheng |
| 6,959,752 B2 | 11/2005 | Huang |
| 6,962,186 B2 | 11/2005 | Hsu |
| 6,966,353 B2 | 11/2005 | Hsu |
| D513,142 S | 12/2005 | Suero, Jr. |
| D513,373 S | 1/2006 | Harwanko |
| 6,994,143 B2 | 2/2006 | Mccarty |
| 7,000,521 B1 | 2/2006 | Cheng |
| 7,000,787 B2 | 2/2006 | Felsenthal |

(56) References Cited

U.S. PATENT DOCUMENTS

| | | |
|---|---|---|
| D516,902 S | 3/2006 | Harwanko |
| D522,844 S | 6/2006 | Harwanko |
| D522,845 S | 6/2006 | Suero, Jr. |
| D522,846 S | 6/2006 | Suero, Jr. |
| D522,847 S | 6/2006 | Suero, Jr. |
| D525,115 S | 7/2006 | Harwanko |
| D525,813 S | 8/2006 | Beasley |
| D526,520 S | 8/2006 | Clucas |
| D527,246 S | 8/2006 | Clucas |
| 7,128,124 B2 | 10/2006 | Bibby |
| D534,793 S | 1/2007 | Suero, Jr. |
| D538,571 S | 3/2007 | Militello |
| D539,064 S | 3/2007 | Militello |
| 7,194,811 B2 | 3/2007 | Militello |
| 7,195,051 B2 | 3/2007 | Nien |
| D542,897 S | 5/2007 | Harwanko |
| D543,747 S | 6/2007 | Harwanko |
| D543,748 S | 6/2007 | Harwanko |
| D544,786 S | 6/2007 | Barrese |
| D545,180 S | 6/2007 | Harwanko |
| 7,225,850 B2 | 6/2007 | Mccarty |
| D547,165 S | 7/2007 | Barrese |
| D547,166 S | 7/2007 | Barrese |
| D547,167 S | 7/2007 | Barrese |
| D548,574 S | 8/2007 | Harwanko |
| 7,255,149 B2 | 8/2007 | Rossato |
| 7,255,312 B2 | 8/2007 | Melic |
| 7,264,035 B2 | 9/2007 | Rossato |
| D562,608 S | 2/2008 | Kramer |
| D562,609 S | 2/2008 | Kramer |
| 7,331,370 B1 | 2/2008 | Militello |
| D563,136 S | 3/2008 | Kramer |
| D563,138 S | 3/2008 | Kramer |
| 7,341,230 B2 | 3/2008 | Beaudry |
| 7,346,940 B1 * | 3/2008 | Liao ........................ A47K 3/38 4/557 |
| D566,991 S | 4/2008 | Harwanko |
| D568,656 S | 5/2008 | Kramer |
| D569,149 S | 5/2008 | Walker |
| D569,668 S | 5/2008 | Kramer |
| D571,136 S | 6/2008 | Kramer |
| D573,386 S | 7/2008 | Clucas |
| D573,387 S | 7/2008 | Walker |
| D576,475 S | 9/2008 | Didehvar |
| D576,476 S | 9/2008 | Didehvar |
| D586,647 S | 2/2009 | Didehvar |
| 7,510,152 B2 | 3/2009 | Melic |
| D591,142 S | 4/2009 | Cittadino |
| 7,549,615 B2 | 6/2009 | Shevick |
| 7,562,689 B1 | 7/2009 | Militello |
| 7,600,549 B2 | 10/2009 | Cheng |
| 7,641,161 B2 | 1/2010 | Bauer |
| 7,658,154 B2 | 2/2010 | Yankello |
| 7,665,500 B2 | 2/2010 | Rossato |
| 7,699,276 B2 | 4/2010 | Melic |
| 7,726,898 B2 | 6/2010 | Lenhart |
| 7,819,166 B2 | 10/2010 | Militello |
| D628,000 S | 11/2010 | Lindo |
| 7,857,151 B2 | 12/2010 | Barrese |
| D632,513 S | 2/2011 | Cittadino |
| D632,514 S | 2/2011 | Didehvar |
| D632,515 S | 2/2011 | Cittadino |
| 7,877,824 B2 | 2/2011 | Grant |
| D633,780 S | 3/2011 | Barrese |
| D635,807 S | 4/2011 | Lindo |
| 7,926,127 B2 | 4/2011 | Barrese |
| 7,931,160 B2 | 4/2011 | Newbouild |
| D640,488 S | 6/2011 | Didehvar |
| D641,190 S | 7/2011 | Cittadino |
| D641,191 S | 7/2011 | Walker |
| D641,193 S | 7/2011 | Vaccaro |
| D641,194 S | 7/2011 | Vaccaro |
| 7,984,814 B2 | 7/2011 | Didehvar |
| D643,236 S | 8/2011 | Kyle |
| D643,657 S | 8/2011 | Cittadino |
| D644,050 S | 8/2011 | Cittadino |
| 7,997,428 B2 * | 8/2011 | Goldstein .............. A47H 1/022 4/558 |
| D647,391 S | 10/2011 | Barrese |
| D648,969 S | 11/2011 | Cittadino |
| D649,352 S | 11/2011 | Cittadino |
| 8,056,873 B1 | 11/2011 | Hanely |
| D650,263 S | 12/2011 | Barrese |
| 8,069,507 B2 | 12/2011 | Didehvar |
| 8,069,632 B2 | 12/2011 | Li |
| 8,069,999 B2 | 12/2011 | Kaveh |
| D652,236 S | 1/2012 | Walker |
| D652,237 S | 1/2012 | Cittadino |
| D653,067 S | 1/2012 | Cittadino |
| 8,104,729 B2 | 1/2012 | Walke |
| 8,113,361 B2 | 2/2012 | Winter |
| 8,152,118 B2 | 4/2012 | Melic |
| 8,157,111 B2 | 4/2012 | Didehvar |
| D660,064 S | 5/2012 | Webb |
| D660,065 S | 5/2012 | Webb |
| D660,066 S | 5/2012 | Webb |
| 8,166,583 B1 | 5/2012 | Liang |
| 8,185,981 B2 | 5/2012 | Didehvar |
| D661,529 S | 6/2012 | Cittadino |
| D661,927 S | 6/2012 | Cittadino |
| D664,423 S | 7/2012 | Cittadino |
| D664,424 S | 7/2012 | Cittadino |
| 8,214,938 B2 | 7/2012 | Hanley |
| 8,215,501 B2 | 7/2012 | Trettin |
| 8,215,863 B2 | 7/2012 | Sohn |
| 8,225,946 B2 | 7/2012 | Yang |
| D666,012 S | 8/2012 | Walker |
| D667,246 S | 9/2012 | Cittadino |
| D667,295 S | 9/2012 | Harwanko |
| 8,297,870 B2 | 10/2012 | Lenhart |
| D670,521 S | 11/2012 | Cittadino |
| D670,522 S | 11/2012 | Cittadino |
| D670,944 S | 11/2012 | Cittadino |
| D671,347 S | 11/2012 | Cittadino |
| D671,348 S | 11/2012 | Cittadino |
| D671,395 S | 11/2012 | Harwanko |
| 8,302,919 B1 | 11/2012 | Mcgrath |
| D672,178 S | 12/2012 | Walker |
| D672,990 S | 12/2012 | Lindo |
| D672,991 S | 12/2012 | Cittadino |
| 8,341,775 B2 | 1/2013 | Didehvar |
| 8,347,936 B2 | 1/2013 | Martin |
| 8,348,072 B2 | 1/2013 | Whitehall |
| 8,403,430 B2 | 3/2013 | Atkins |
| 8,408,405 B2 | 4/2013 | Yang |
| D681,422 S | 5/2013 | Lindo |
| D681,423 S | 5/2013 | Walker |
| D684,037 S | 6/2013 | Harwanko |
| 8,479,932 B2 | 7/2013 | Carney |
| 8,491,568 B2 | 7/2013 | Schertiger |
| 8,500,357 B2 | 8/2013 | Stahle |
| 8,505,129 B2 | 8/2013 | Parker |
| D691,029 S | 10/2013 | Didehvar |
| D691,030 S | 10/2013 | Lindo |
| D691,031 S | 10/2013 | Harwanko |
| 8,544,661 B1 | 10/2013 | Melino, Sr. |
| 8,561,667 B1 | 10/2013 | Hanley |
| D693,209 S | 11/2013 | Walker |
| 8,573,416 B2 | 11/2013 | Didehvar |
| 8,578,995 B2 | 11/2013 | Nelson |
| 8,585,160 B2 | 11/2013 | Atkins |
| D696,573 S | 12/2013 | Didehvar |
| 8,616,138 B1 | 12/2013 | Fu |
| D702,112 S | 4/2014 | Cittadino |
| 8,696,229 B2 | 4/2014 | Tran |
| 8,763,821 B2 | 7/2014 | Yang |
| 8,763,822 B2 | 7/2014 | Didehvar |
| 8,807,513 B2 | 8/2014 | Volin |
| 8,814,114 B2 | 8/2014 | Baines |
| 8,827,587 B2 | 9/2014 | Didehvar |
| 8,839,980 B2 | 9/2014 | Baines |
| D714,571 S | 10/2014 | Walker |
| 8,851,305 B2 | 10/2014 | Didehvar |
| 8,851,435 B1 | 10/2014 | Bastien |

(56) References Cited

U.S. PATENT DOCUMENTS

| | | | |
|---|---|---|---|
| 8,869,999 | B2 | 10/2014 | Lindo |
| 8,875,770 | B1 | 11/2014 | Martin |
| 8,960,456 | B2 | 2/2015 | Didehvar |
| 8,978,228 | B2 | 3/2015 | Didehvar |
| 9,009,878 | B2 | 4/2015 | Baines |
| 9,021,627 | B2 | 5/2015 | Parker |
| 9,033,163 | B2 | 5/2015 | Hsu |
| 9,066,637 | B2 | 6/2015 | Zeng |
| 9,107,495 | B2 | 8/2015 | Lindo |
| 9,107,496 | B2 | 8/2015 | Lindo |
| 9,107,529 | B2 * | 8/2015 | Didehvar ............... A47H 1/022 |
| 9,107,544 | B2 | 8/2015 | Cittadino |
| 9,131,795 | B2 | 9/2015 | Didehvar |
| 9,161,664 | B2 | 10/2015 | Zeng |
| 9,181,967 | B2 | 11/2015 | Lim |
| 9,194,415 | B2 | 11/2015 | Ou |
| 9,204,764 | B1 | 12/2015 | Hanley |
| D746,667 | S | 1/2016 | Vaccaro |
| 9,271,592 | B2 | 3/2016 | Didehvar |
| 9,339,151 | B2 | 5/2016 | Yang |
| 9,357,860 | B1 | 6/2016 | Klowan |
| 9,388,837 | B1 | 7/2016 | Hanley |
| 9,468,294 | B2 | 10/2016 | Fu |
| 9,474,421 | B2 | 10/2016 | Baines |
| 9,480,314 | B2 | 11/2016 | Heim |
| 9,578,995 | B2 | 2/2017 | Hanley |
| 9,693,660 | B1 | 7/2017 | Stelmarski |
| 9,770,138 | B2 | 9/2017 | Engell |
| 9,808,125 | B2 | 11/2017 | Jepson |
| 9,883,742 | B2 | 2/2018 | Yang |
| 9,943,192 | B2 | 4/2018 | Yang |
| 9,999,322 | B2 | 6/2018 | Hain |
| 10,016,077 | B1 | 7/2018 | Carney |
| 10,034,587 | B1 | 7/2018 | Elliot |
| 10,047,787 | B2 | 8/2018 | Cheng |
| 10,064,523 | B2 | 9/2018 | Engell |
| 10,070,748 | B2 | 9/2018 | Hanley |
| 10,092,126 | B2 | 10/2018 | Baines |
| 10,278,529 | B2 | 5/2019 | Baines |
| 10,422,470 | B2 | 9/2019 | Cote |
| 10,426,287 | B1 | 10/2019 | Tsai |
| 10,463,199 | B2 | 11/2019 | Coratolo |
| 10,485,383 | B2 | 11/2019 | Worden, IV |
| 10,595,683 | B1 | 3/2020 | Stelmarski |
| 10,612,576 | B2 | 4/2020 | Hanley |
| 10,758,091 | B2 | 9/2020 | Engell |
| 10,786,105 | B2 | 9/2020 | Scanlon |
| 10,844,890 | B2 | 11/2020 | Daniels |
| 10,925,403 | B1 | 2/2021 | Su |
| 10,959,559 | B2 | 3/2021 | Moss |
| 10,995,786 | B2 * | 5/2021 | Didehvar ............... F16B 7/025 |
| 11,116,324 | B2 | 9/2021 | Leng |
| 11,382,447 | B2 | 7/2022 | Berman |
| 2002/0158033 | A1 | 10/2002 | Chen |
| 2003/0209509 | A1 | 11/2003 | Felsenthal |
| 2004/0182806 | A1 | 9/2004 | Figueroa |
| 2004/0228704 | A1 | 11/2004 | Rotshtain |
| 2005/0263655 | A1 | 12/2005 | Bauer |
| 2006/0156465 | A1 | 7/2006 | Lavi |
| 2006/0204322 | A1 | 9/2006 | Roiser |
| 2007/0170134 | A1 | 7/2007 | Bishop |
| 2008/0163418 | A1 | 7/2008 | Barrese |
| 2009/0184078 | A1 | 7/2009 | Lee |
| 2009/0223642 | A1 | 9/2009 | Militello |
| 2009/0223917 | A1 | 9/2009 | Grant |
| 2010/0206492 | A1 | 8/2010 | Shevick |
| 2010/0310306 | A1 | 12/2010 | Wright |
| 2010/0316438 | A1 | 12/2010 | Sohn |
| 2011/0226925 | A1 | 9/2011 | Tsai |
| 2011/0284484 | A1 | 11/2011 | Lin |
| 2011/0297632 | A1 | 12/2011 | Goldstein |
| 2012/0005823 | A1 * | 1/2012 | Baines ............... A47K 3/38 4/610 |
| 2012/0017366 | A1 | 1/2012 | Barrese |
| 2012/0103924 | A1 | 5/2012 | Chuang |
| 2012/0152872 | A1 | 6/2012 | Didehvar |
| 2012/0152873 | A1 | 6/2012 | Didehvar |
| 2012/0152874 | A1 | 6/2012 | Didehvar |
| 2012/0217215 | A1 | 8/2012 | Emery |
| 2012/0241399 | A1 | 9/2012 | Trettin |
| 2012/0284914 | A1 | 11/2012 | Bauer |
| 2012/0285914 | A1 | 11/2012 | Carney |
| 2013/0045041 | A1 | 2/2013 | Sohn |
| 2013/0047331 | A1 | 2/2013 | Parker |
| 2013/0112639 | A1 | 5/2013 | Baines |
| 2013/0198948 | A1 | 8/2013 | Zeng |
| 2013/0198949 | A1 | 8/2013 | Hai |
| 2013/0200024 | A1 | 8/2013 | Lindo |
| 2013/0306828 | A1 | 11/2013 | Volin |
| 2013/0334156 | A1 | 12/2013 | Baines |
| 2013/0341474 | A1 | 12/2013 | Baines |
| 2014/0124598 | A1 | 5/2014 | Vaccaro |
| 2014/0130331 | A1 | 5/2014 | Didehvar |
| 2014/0131298 | A1 | 5/2014 | Didehvar |
| 2014/0131299 | A1 | 5/2014 | Didehvar |
| 2014/0166603 | A1 | 6/2014 | Baines |
| 2014/0224754 | A1 | 8/2014 | Baines |
| 2014/0263123 | A1 | 9/2014 | Ford |
| 2014/0360959 | A1 | 12/2014 | Didehvar |
| 2014/0360960 | A1 | 12/2014 | Didehvar |
| 2015/0034581 | A1 | 2/2015 | Hsu |
| 2015/0265086 | A1 | 9/2015 | Hanley |
| 2015/0285286 | A1 | 10/2015 | Sanford |
| 2015/0297038 | A1 | 10/2015 | Vaccaro |
| 2016/0113447 | A1 | 4/2016 | Walker |
| 2016/0206126 | A1 | 7/2016 | Ford |
| 2016/0374518 | A1 | 12/2016 | Baines |
| 2017/0360261 | A1 | 12/2017 | Coratolo |
| 2018/0008101 | A1 | 1/2018 | Engell |
| 2018/0014680 | A1 | 1/2018 | Hanley |
| 2018/0020880 | A1 | 1/2018 | Patterson |
| 2018/0051739 | A1 | 2/2018 | Cheng |
| 2018/0064279 | A1 | 3/2018 | Hanley |
| 2018/0098656 | A1 | 4/2018 | Baines |
| 2018/0296018 | A1 | 10/2018 | Baines |
| 2018/0306219 | A1 | 10/2018 | Hanley |
| 2019/0082875 | A1 | 3/2019 | Scanlon |
| 2019/0099034 | A1 | 4/2019 | Hanley |
| 2020/0281389 | A1 | 9/2020 | Moss |
| 2021/0030187 | A1 | 2/2021 | Berman |
| 2021/0177183 | A1 | 6/2021 | Moss |
| 2021/0244200 | A1 | 8/2021 | Webb |
| 2021/0353053 | A1 | 11/2021 | Berman |
| 2022/0160158 | A1 | 5/2022 | Scanlon |
| 2022/0225762 | A1 | 7/2022 | Berman |
| 2023/0337846 | A1 | 10/2023 | Moss |
| 2023/0404310 | A1 | 12/2023 | Berman |

FOREIGN PATENT DOCUMENTS

| | | |
|---|---|---|
| DE | 1046998 | 12/1958 |
| DE | 3518106 | 11/1986 |
| DE | 29720821 | 2/1998 |
| DE | 29807681 | 7/1998 |
| DE | 102008036149 | 6/2010 |
| DE | 202019106467 | 12/2019 |
| EP | 0314357 | 5/1989 |
| EP | 2113674 | 11/2009 |
| FR | 382527 | 2/1908 |
| FR | 474169 | 2/1915 |
| FR | 718486 | 1/1932 |
| WO | 2016122378 | 8/2016 |

OTHER PUBLICATIONS

Artika Tension Shower Caddy with Mirror in Aluminum, <https://www.homedepot.com/p/ARTIKA-Tension-Shower-Caddy-with-Mirror-in-Aluminum-ATL58-C1/302023780>, Publicly available for purchase before May 18, 2020, 2 pages.

Better Homes & Gardens Tension Pole Shower Caddy, <https://www.walmart.com/ip/Better-Homes-Gardens-Tension-Pole-Shower-Caddy-Oil-Rubbed-Bronze/900634206>, Publicly available for purchase before May 18, 2020, 3 pages.

(56) References Cited

OTHER PUBLICATIONS

Better Homes & Gardens, Model 2147HBWM (Oil Rubbed Bronze) Instruction Manual, Dec. 13, 2017, 10 pages.
Glacier Bay L Style Tension Pole Shower Caddy in Bronze with 4-Shelves (1002928650), <https://www.homedepot.com/p/Glacier-Bay-L-Style-Tension-Pole-Shower-Caddy-in-Bronze-with-4-Shelves-2130HBHD/303838532?NCNI-5>, Publicly available for purchase before May 18, 2020, 3 pages.
Glacier Bay Rustproof Tension Pole Shower Caddy in Satin Chrome (1002928717), <https://www.homedepot.com/p/Glacier-Bay-Rustproof-Tension-Pole-Shower-Caddy-in-Satin-Chrome-2141ALHD/303880494>, Publicly available for purchase before May 18, 2020, 2 pages.
InterDesign 4 Tier Tension Caddy, <https://www.kohls.com/product/prd-3451054/interdesign-4-tier-tension-caddy.jsp>, Publicly available for purchase before May 18, 2020, 1 page.
Kenney Gray 4-Tier Tension Pole Shower Caddy, <https://www.biglots.com/product/gray-4-tier-tension-pole-shower-caddy/p810196875>, Publicly available for purchase before May 18, 2020, 2 pages.
Kenney Instruction Manual, Kenney Manufacturing Company, Publicly available for purchase before May 18, 2020, 4 pages.
Made by Design (Target) Pole Caddy Instruction Manual, Style #91830 (Aluminum), 2019, 17 pages.
Made by Design L-Shaped Tension Pole Caddy Chrome, <https://www.target.com/p/steel-I-shaped-tension-pole-caddy-chrome-made-by-design-8482/-/A-54154453#Ink=sametab>, Publicly available for purchase before May 18, 2020, 3 pages.
Made by Design Rustproof Aluminum Tension Pole Caddy Chrome, <https://www.target.com/p/rustproof-aluminum-tension-pole-caddy-chrome-made-by-design-8482/-/A-54154994#Ink=sametab>, Publicly available for purchase before May 18, 2020, 3 pages.
Made by Design Steel Corner Pole Caddy, <https://www.target.com/p/steel-corner-pole-caddy-made-by-design-153/-/A-54513380?preselect=54149567#Ink=sametab>, Publicly available for purchase before May 18, 2020, 3 pages.
Mainstays Tension Pole Shower Caddy, <https://www.walmart.com/ip/Mainstays-Tension-Pole-Shower-Caddy-Chrome/700323962>, Publicly available for purchase before May 18, 2020, 2 pages.
Mainstays, 3-Tier Tension Pole Shower Caddy, <https://www.walmart.com/ip/Mainstays-3-Tier-Tension-Pole-Shower-Caddy-Satin-Nickel/634266997>, Publicly available for purchase before May 18, 2020, 3 pages.
Org 3-Tier Pole Caddy, <https://www.bedbathandbeyond.com/store/product/org-3-tier-pole-caddy/3317048?keyword=org-shower-caddy>, Publicly available for purchase before May 18, 2020, 2 pages.
Oxo 4-Tier Anodized Aluminum Tension Pole Shower Caddy, <https://www.bedbathandbeyond.com/store/product/oxo-4-tier-anodized-aluminum-tension-pole-shower-caddy/5193005>, Publicly available for purchase before May 18, 2020, 2 pages.
Oxo Good Grips Quick-Extend Aluminum Pole Caddy (13241500) Instruction Manual, Oxo Good Grips, Publicly available for purchase before May 18, 2020, 2 pages.

Photographs of end cap by Zenith Products Corporation, publicly available before Mar. 8, 2019 (5 pages).
Pictures of Better Homes & Gardens, Smart Rods Ball Adjustable Drapery Rod, Oil-Rubbed Bronze Finish and Instructions (with English translation), known to be publicly available before Mar. 15, 2018 but not before Sep. 16, 2015, 18 pages.
Product 1—Pictures of an Adjustable Rod, publicly available before Mar. 8, 2019, 1 page.
Product 2—Pictures of an Adjustable Rod, publicly available before Mar. 8, 2019, 1 page.
Product 3—Pictures of an Adjustable Rod, publicly available before Mar. 8, 2019, 1 page.
Product 4—Pictures of an Adjustable Rod, publicly available before Mar. 8, 2019, 2 pages.
Product 5—Pictures of an Adjustable Rod, publicly available before Mar. 8, 2019, 1 page.
Product 6—Pictures of an Adjustable Rod, publicly available before Mar. 8, 2019, 1 page.
Product 7—Pictures of an Adjustable Rod, publicly available before Mar. 8, 2019, 2 pages.
Salt Steel 3-Tier Pole Shower Caddy in Sterling, <https://www.bedbathandbeyond.com/store/product/salt-steel-3-tier-pole-shower-caddy-in-sterling/5023377?keyword=salt-shower-caddy>, Publicly available for purchase before May 18, 2020, 2 pages.
SimpleHuman Stainless Steel Tension Pole Shower Caddy, <https://www.containerstore.com/s/bath/shower-bathtub/simplehuman-stainless-steel-tension-pole-shower-caddy/12d?productId=10028454&gclid=CjwKCAiAgc-ABhA7EiwAjev-j2IPg4hrY14NADnrmdkkIYKinu_0IYYHUbHezs4dVsjeVL2-kaSQSBoCjdcQAvD_BwE>, Publicly available for purchase before May 18, 2020, 1 pages.
Titan Never Rust Premium Aluminum Tension Caddy in Satin Chrome, <https://www.bedbathandbeyond.com/store/product/titan-reg-never-rust-reg-premium-aluminum-tension-caddy-in-satin-chrome/5049773> Publicly available for purchase before May 18, 2020, 2 pages.
U.S. Appl. No. 16/877,084, entitled "Customizable Shower Caddy," filed Jun. 11, 2020.
Zenna Home Corner Pole Caddy Nickel, <https://www.target.com/p/corner-pole-caddy-nickel-zenna-home/-/A-79196668#Ink=sametab>, Publicly available for purchase before May 18, 2020, 5 pages.
Zenna Home L-Shaped Pole Caddy Nickel, <https://www.target.com/p/l-shaped-pole-caddy-nickel-zenna-home/-/A-79196669#Ink=sametab>, Publicly available for purchase before May 18, 2020, 2 pages.
Zenna Model 2149PC (Chrome) Instruction Manual, Zenith Products, Dec. 6, 2017, 10 pages.
Ikea Botaren Shower Curtain Tension rod Assembly Manual, Publically available for purchase before Jun. 15, 2023, 4 pages.
Picture of Ikea Botaren Shower Curtain Tension rod, Publically available for purchase before Jun. 15, 2023.
U.S. Appl. No. 18/389,502 entitled "Spring-Biased End Caps For Rod Assembly and Methods of Use," filed Dec. 13, 2023.

* cited by examiner

ADJUSTABLE ROD FEATURES

CROSS-REFERENCE TO RELATED APPLICATIONS

This is a continuation application of U.S. application Ser. No. 16/943,282, filed Jul. 30, 2020, which claims the benefit of U.S. Provisional Application No. 62/880,483, filed Jul. 30, 2019, which are hereby incorporated by reference in their entireties.

FIELD OF THE INVENTION

The subject matter of this application relates to adjustable support rods and, more particularly, a lock mechanism and end caps for adjustable support rods.

BACKGROUND OF THE INVENTION

Adjustable rods are used horizontally to support shower curtains or drapery. They also can be used vertically to hold baskets and other items. One common vertical use is a shower caddy. Typical adjustable rods include an outer rod and an inner rod that slides telescopically in and out of the outer rod to adjust the overall length of the rods. A lock mechanism secures the outer and inner rods together when adjusted to the desired length.

Adjustable end caps also can be used with adjustable rods. The end caps can be used to further secure the rods between their opposing support surfaces, such as walls. Many adjustable end caps include complicated systems.

There is a need to improve the lock mechanism so that sufficient locking force is applied to prevent slippage between the two rods. There also is a need to improve adjustable end cap systems to simplify construction.

DETAILED DESCRIPTION

Figure 1:
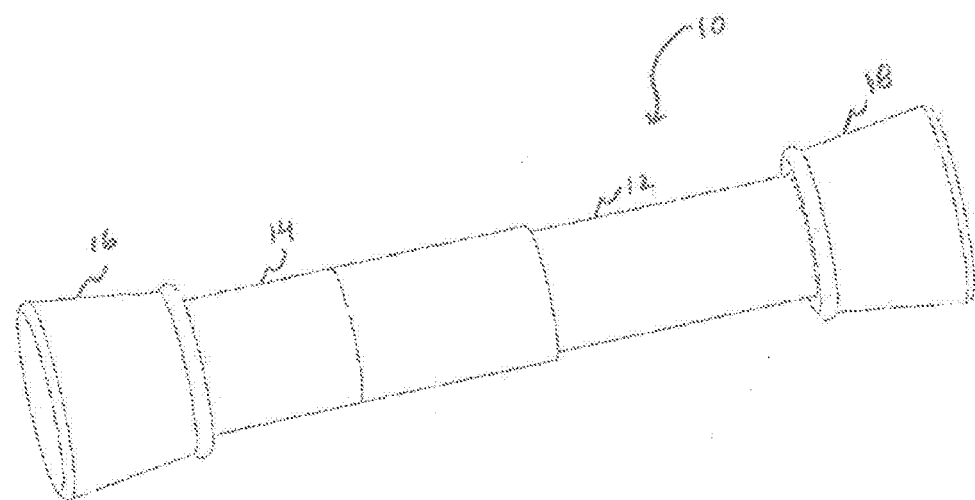
FIG. 1 is a perspective view of an adjustable rod embodying features of the present invention.

With reference to FIG. 1, there is illustrated an adjustable rod 10 with a hollow, inner rod 12 and a hollow, outer rod 14. The inner rod 12 is telescopically received in the outer rod 14 in order to adjust the overall length of the adjustable rod 10. One end of the outer rod 14 is fitted with a first end cap assembly 16, and one end of the inner rod 12 is fitted with a second end assembly 18. The end cap assemblies 16, 18 engage opposing support surfaces and may be identical. As described further below, the end cap assemblies 16, 18 also may be adjustable to further secure the adjustable rod 10 between support surfaces.

Figure 2:
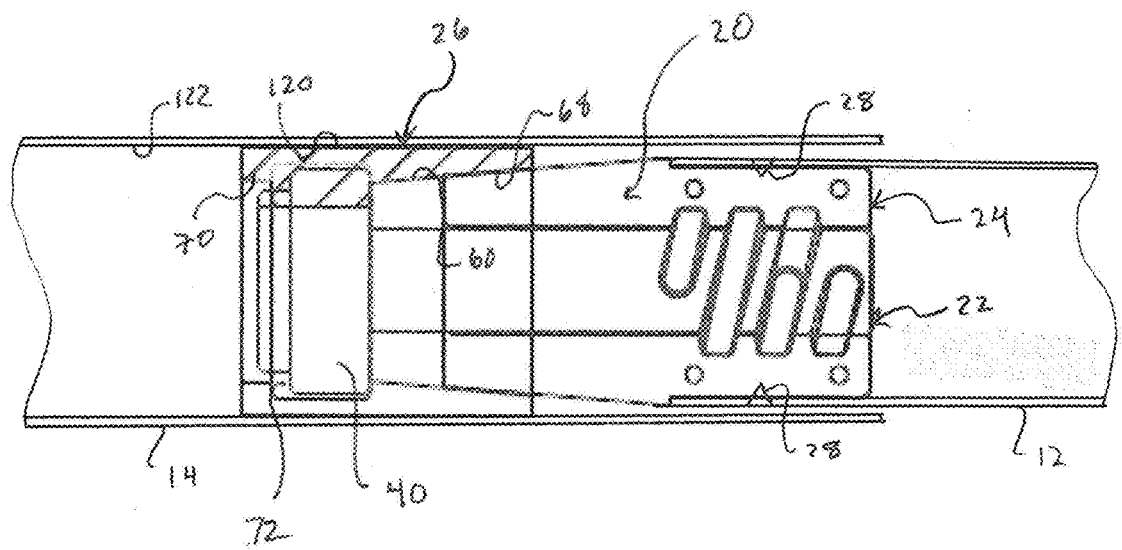
FIG. 2 is a cross-sectional view of a portion of the adjustable rod of FIG. 1 showing a lock mechanism in an unlocked state.
Figure 3:
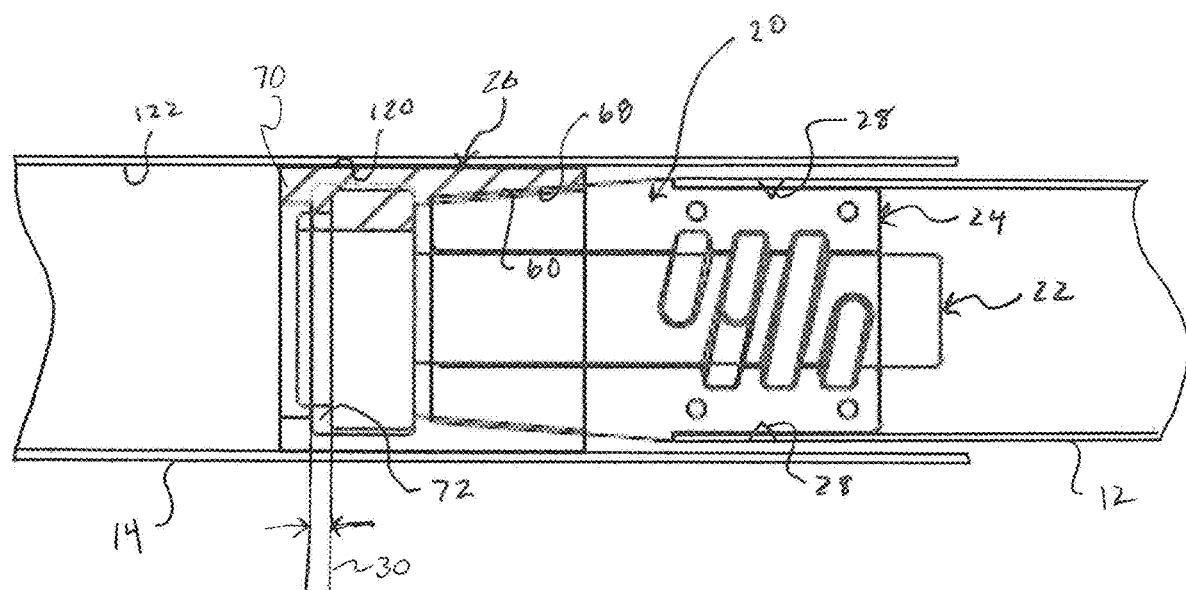
FIG. 3 is cross-sectional view of the portion of the lock mechanism of FIG. 2 showing the lock mechanism in a locked state.
Figure 4:
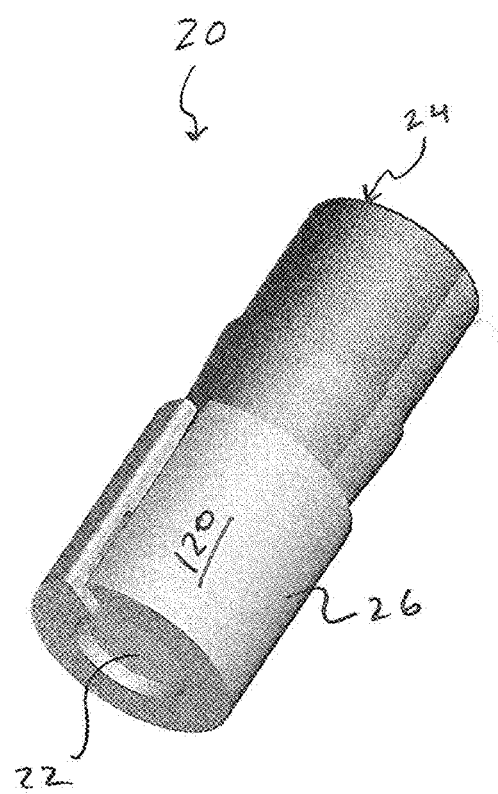
FIG. 4 is a perspective view of the lock mechanism of FIG. 2.

As shown in FIGS. 2-4, the adjustable rod 10 includes a lock mechanism 20 interconnecting the inner and outer rods 12, 14. The lock mechanism 20 includes a wedge shaft 22, a rod insert 24 and a wedge 26. The rod insert 24 is attached to the inner rod 12 and extends into the outer rod 14. Dimples 28 formed in the inner rod 12 can bite into the rod insert 24 to hold the rod insert 24 against longitudinal and rotational movement relative to the inner rod 12. The wedge 26 is positioned in the outer rod 14, and the wedge shaft 22 operatively interconnects the rod insert 24 and the wedge 26.

To secure the lock mechanism 20, the inner and outer rods 12, 14 are turned in opposite directions which causes the wedge 26 to be tightly seated between the outer rod 14 and the rod insert 24. In situations where the end cap systems 16, 18 are adjustable, additional inward force on the inner and outer rods 12, 14 caused by the end cap assemblies 16, 18 during their adjustment can cause the inner and outer rods 12, 14 to inadvertently adjust relative to one another. FIG. 2 shows the lock mechanism 20 in an unlocked state, and FIG. 3 shows the lock mechanism 20 in a locked state. With reference to FIG. 3, the lock mechanism 20 provides an adjustment gap 30 that enables the lock mechanism 20 to tighten even further when the end cap assemblies 16, 18 are adjusted. The adjustment gap 30 allows the wedge 26 to move further towards the rod insert 24 to provide an even tighter seating of the wedge 26 between the outer rod 14 and rod insert 24 to prevent unintentional shifting of the outer and inner rods 12, 14 relative to one another.

Figure 5:
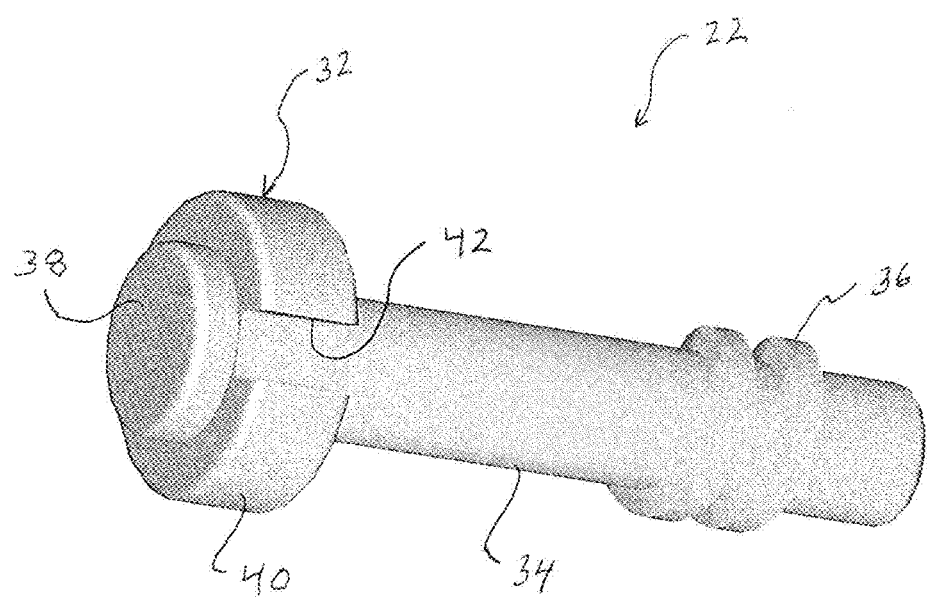
FIG. 5 is a perspective view of a wedge shaft of the lock mechanism of FIG. 2.

As shown in FIG. 5, the wedge shaft 22 includes a stepped head portion 32, a shaft 34 and threading 36 along at least a portion of the shaft 34. The stepped head portion 32 includes a terminal disc end 38 that rotates in the wedge 26. Immediately inward of the terminal disc end 38 is an annular flange 40 that moves the wedge 26 between the locked state and unlocked states (FIGS. 2 and 3). The flange 40 includes an axially extending slot 42.

Figure 6:
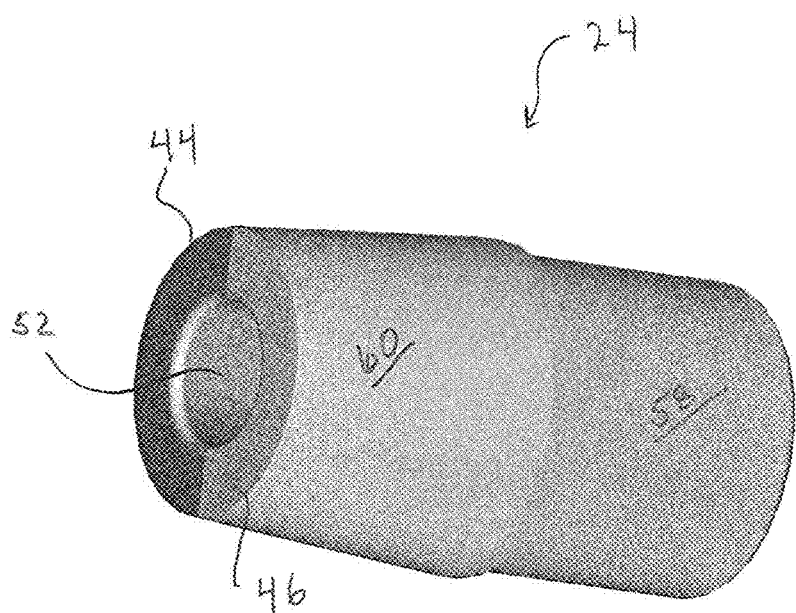
FIG. 6 is a perspective view of a rod insert of the lock mechanism of FIG. 2.
Figure 7:
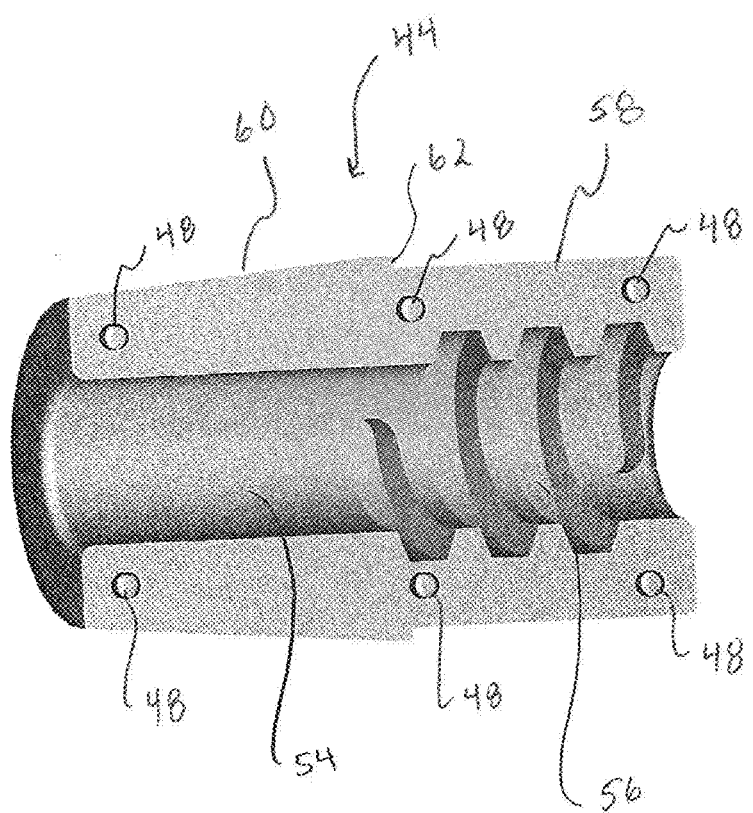
FIG. 7 is a perspective view of one half of the rod insert of FIG. 6.
Figure 8:
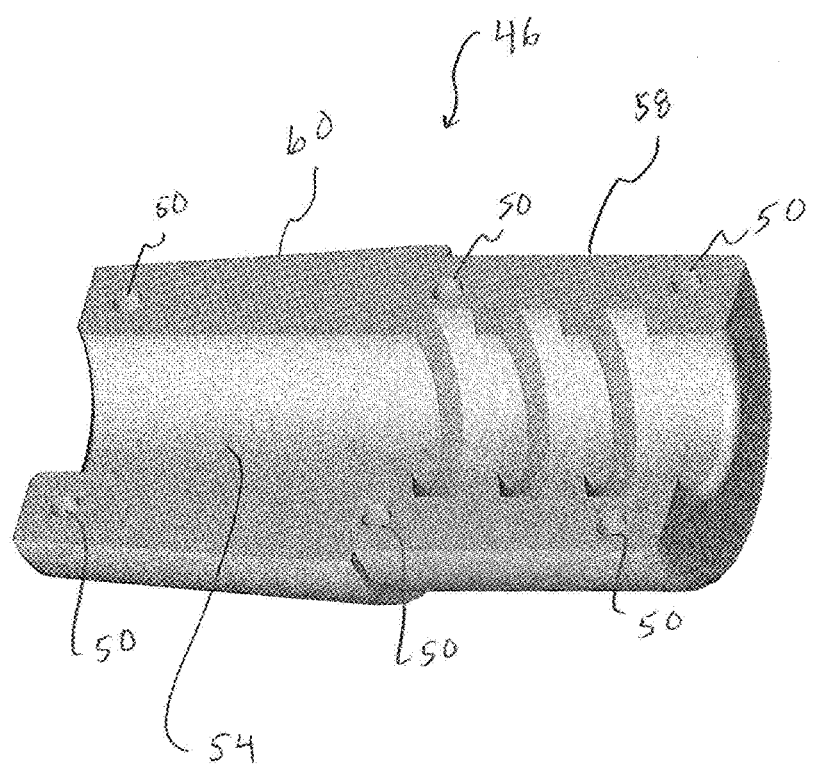
FIG. 8 is a perspective view the other half of the rod insert of FIG. 6.

With reference to FIGS. 6-8, the rod insert 24 may be a two part component with a first component 44 and a second component 46. The two components 44, 46 are mirror images of one another except that the first component 44 may include a number of pegs 48 and the second component 46 may include a number of complimentary sockets 50 for receiving the pegs 48 to align the components 44, 46. The rod insert 24 defines an internal passage 52 with a smooth portion 54 and a threaded portion 56. The wedge shaft 22 extends through the internal passage 52, and the threading 36 of the wedge shaft 22 engages with the threaded portion 56 of the rod insert 24. The outer surface 58 of the threaded portion 56 is cylindrical, and the outer surface 60 of the smooth portion is conical. An annular step 62 transitions the cylindrical outer surface 56 with the conical outer surface 60. The step 62 engages an end of the inner rod 12 to limit insertion of the rod insert 24 into the inner rod 12 to only the cylindrical outer surface 58.

Figure 9:
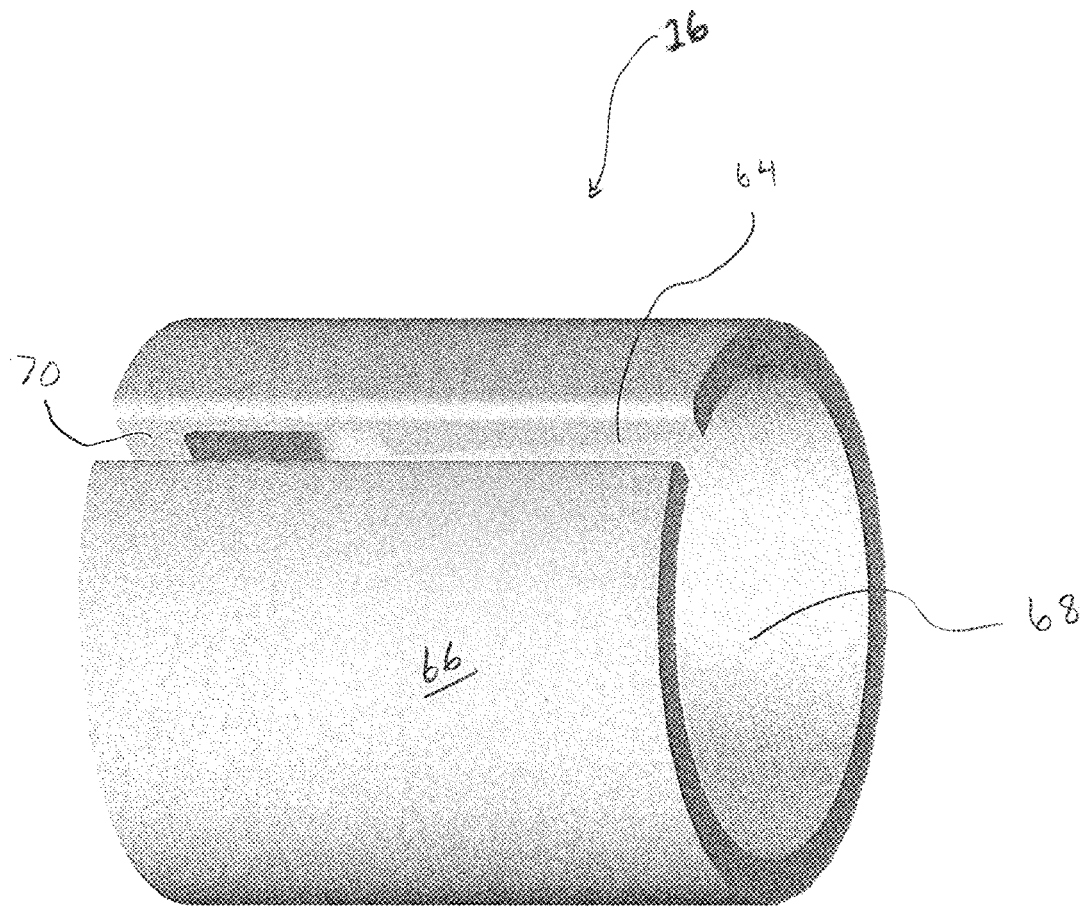
FIG. 9 is a perspective view of a wedge of the lock mechanism of FIG. 2.
Figure 10:
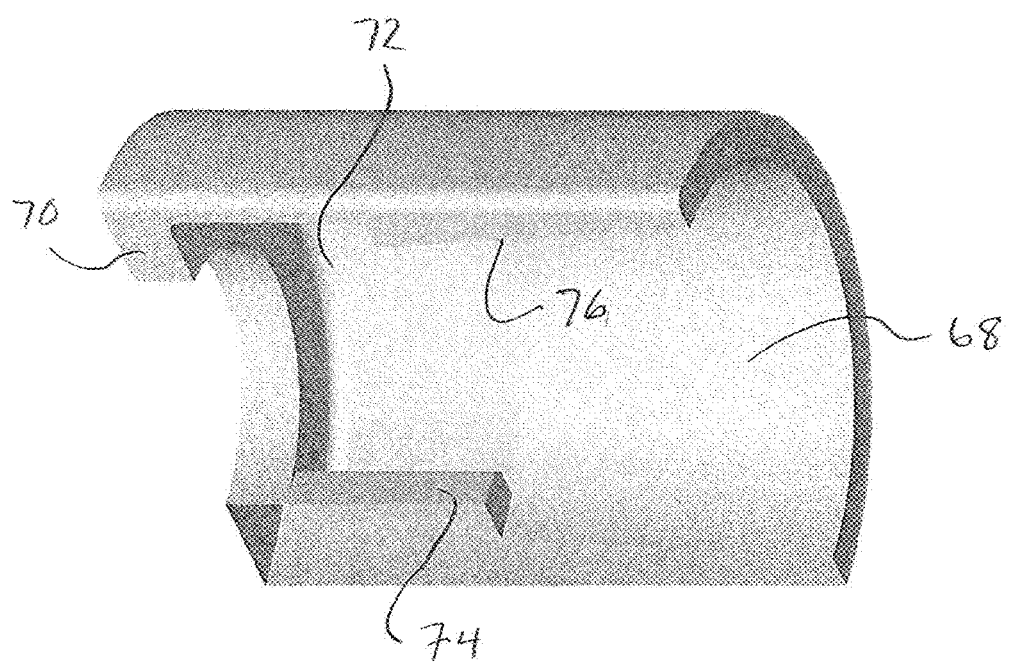
FIG. 10 is a cross-section view of the wedge of FIG. 9.

As shown in FIGS. 9 and 10, the wedge 26 has a split configuration with an axially extending gap 64 and a conical outer surface 66. The wedge 26 defines a longitudinally extending passage 68 with an annular stop 70 at on end. Immediately adjacent the annular stop is an annular recess 72 that is intersected by an axially extending rib 74. Then, just inward of the annular recess 72 is an annular conical surface 76. The annular conical surface 76 slides against the outer conical surface 60 of the rod insert 24 when moving the wedge 16 between the locked and unlocked states.

Figure 11:
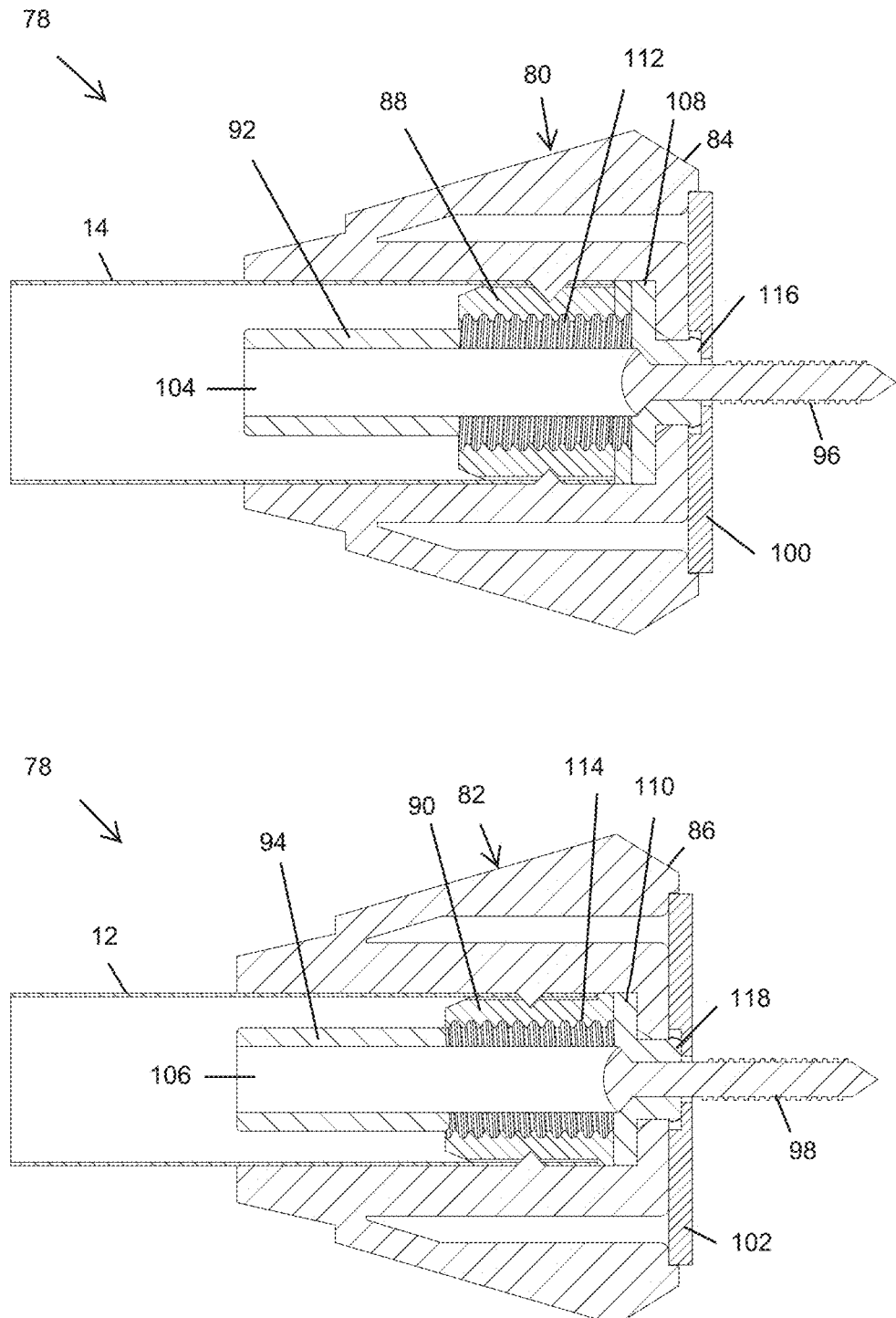
FIG. 11 is cross-section view of right and left end cap systems.

With reference to FIG. 11, there is illustrated examples of left and right end cap assemblies 16, 18 that can be used with the above lock mechanism 20. These examples do not preclude the use of other types of end cap systems that can be used with the lock mechanism 20. These examples include a dual-mount end cap system 78. The dual-mount end cap system 78 receives the ends of the inner and outer rods 12, 14 of the adjustable rod 10 described above.

In general, the dual-mounted end cap system 78 includes a left end cap assembly 80 for the outer rod 14 and a right end cap assembly 82 for the inner rod 12. The left and right end cap assemblies 80, 82 include left and right endcaps 84, 86, left and right threaded tube inserts 88, 90, left and right threaded endcap inserts 92, 94, fasteners 96, 98, and pads 100, 102. The left and right endcap inserts 92, 94 include a passage 104, 106, a flange 108, 110, a left-hand threaded portion 112 on the left endcap insert 92, a right-hand threaded portion 114 on the right endcap insert 94, and a head 116, 118.

The adjustable rod 10 uses the lock mechanism 20 to set the rods 12, 14 relative to one another and then can be turned so that the end cap assemblies 80, 82 extend outward from the outer tubes 12, 14 to tighten against the two surfaces. The fasteners 96, 98 also can be used to pre-mount the end cap assemblies 80, 82 to the surfaces. For example, the end cap assemblies 80, 82 can be first mounted to the walls at the desired locations with the fasteners 96, 98. Then, the adjustable rod 10 can be expanded and the ends of the rods 12, 14 can be inserted into the end cap assemblies 80, 82. This aids in the positioning of the adjustable rod 10 at its desired orientation (e.g., right height, lateral position and level). When the adjustable rod 10 is turned to operate the threaded tube inserts 88, 90 and the threaded endcap inserts 92, 94, the end caps 84, 86 are prevented from moving or walking around on the mounting surfaces.

When an end cap assembly places pressure on a mounting surface, there also is a compressive force on the rods and the lock mechanism, such as the lock mechanism 20. In some cases, the pressure exceeds the locking force of the lock mechanism, and the rods will slide inward relative to one another. However, the adjustment gap 30 of the lock mechanism 20 is formed because the longitudinal length of the annular recess 72 of the wedge 26 is slightly larger than the thickness of the annular flange 40 of the wedge shaft 22. In one embodiment, the longitudinal length of the annular recess 72 may be 0.350 inches, and the thickness of the annular flange may be 0.254 inches, creating an adjustment gap of 0.096 inches. Overall, the adjustment gap 30 allows the compressive force to further move the rod insert 24 and the wedge 26 towards one another to increase the locking force of the lock mechanism 20. This prevents the rods 12, 14 from unintentionally slipping relative to one another. This assists users that may not be strong enough to initially set the lock mechanism 20.

More specifically, to install the adjustable rod 10, the lock mechanism 20 is first in the unlocked state, as shown in FIG. 2. Then, the inner and outer rods 12, 14 are pulled apart to set the desired length. Once the length is set, at least one of the rods 12, 14 is turned relative to the other to activate the lock mechanism 20. For instance, the outer rod 14 can be held stationary in one's left hand, while the inner rod 12 can be turned with one's right hand towards the user's body. This will hold the wedge 26 against rotating because an outer surface 120 of the wedge 26 has a friction engagement with an inner surface 122 of the outer rod 14. Alternatively, instead of holding the outer rod 14 stationary, it also can be turned with one's left hand away from one's body simultaneously with turning the inner rod 12. In either case, this will cause the rod insert 24 to turn and the threading 36 on the wedge shaft 22 to engage the threaded portion 56 of the rod insert 24. This, in turn, will cause the annular flange 40 of the wedge shaft 22 to shift to the inner side of the annular recess 72 to draw the wedge 26 toward the rod insert 24. The annular conical surface 76 of the wedge 26 will ride along the conical outer surface 66 of the rod insert 24. This forces the wedge 26 to lodge with a tight friction fit between the outer rod 14 and the rod insert 24 to prevent the rods 12, 14 from moving relative to one another. The longitudinally extending gap 64 along the wedge 26 will widen as the wedge 26 moves along the rod insert 24.

The adjustment gap 30 will allow the use of adjustable end cap systems, such as assemblies 80, 82, to further drive the wedge 26 onto the conical outer surface 60 of the rod insert 24 to provide further locking force. More specifically, as the adjustable end assemblies 80, 82 are activated by turning the rods 12, 14 together in the same direction, such as towards the user, the end assemblies 80, 82 extend from the rods 12, 14 and will apply a compressive force on the rods 12, 14. This compressive force will cause the wedge 26 to automatically shift further along the conical outer surface 60 of the rod insert 24 to lodge even further between the outer rod 14 and the rod insert 24 to provide an even righter friction fit between the outer rod 14 and the rod insert 24 to prevent the rods 12, 14 from moving relative to one another.

The rib 74 of the wedge 26 sits in the longitudinally extending gap 42 of the annular flange 40 of the wedge shaft 22. This keys the wedge shaft 22 to the wedge 26 to prevent rotational movement between the two.

To undo the locking mechanism 20, the rods 12,14 are turned in the direction opposite to the locking directions. In this operation, the annular flange 40 of the wedge shaft 22 engages the annular stop 70 at the other side of the annular recess 72 of the wedge 26 and drives the wedge 26 down the conical outer surface 60 of the rod insert 24 materials.

Figure 12:
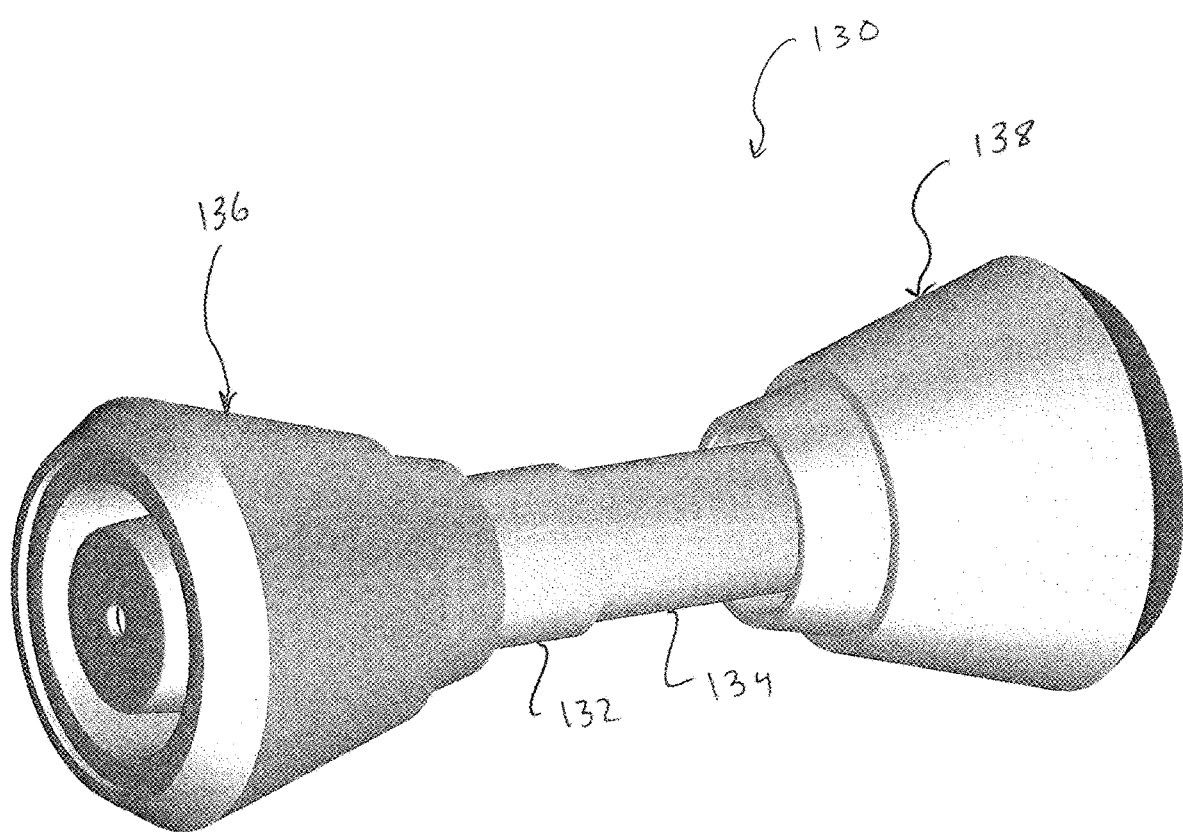
FIG. 12 is a perspective view of an alternative end cap system.

Turning now to FIG. 12, there is illustrated another adjustable rod 130 with an outer rod 132 and an inner rod 134. The adjustable rod 130 may include the lock mechanism 20 or other lock mechanisms. The adjustable rod 130 embodies alternate left and right end cap assemblies 136, 138. The end cap assemblies 136, 138 are the same except that the left end cap assembly 136 is sized for the outer rod 132 and the right end cap assembly 138 is sized for the inner rod 134.

Figure 13:
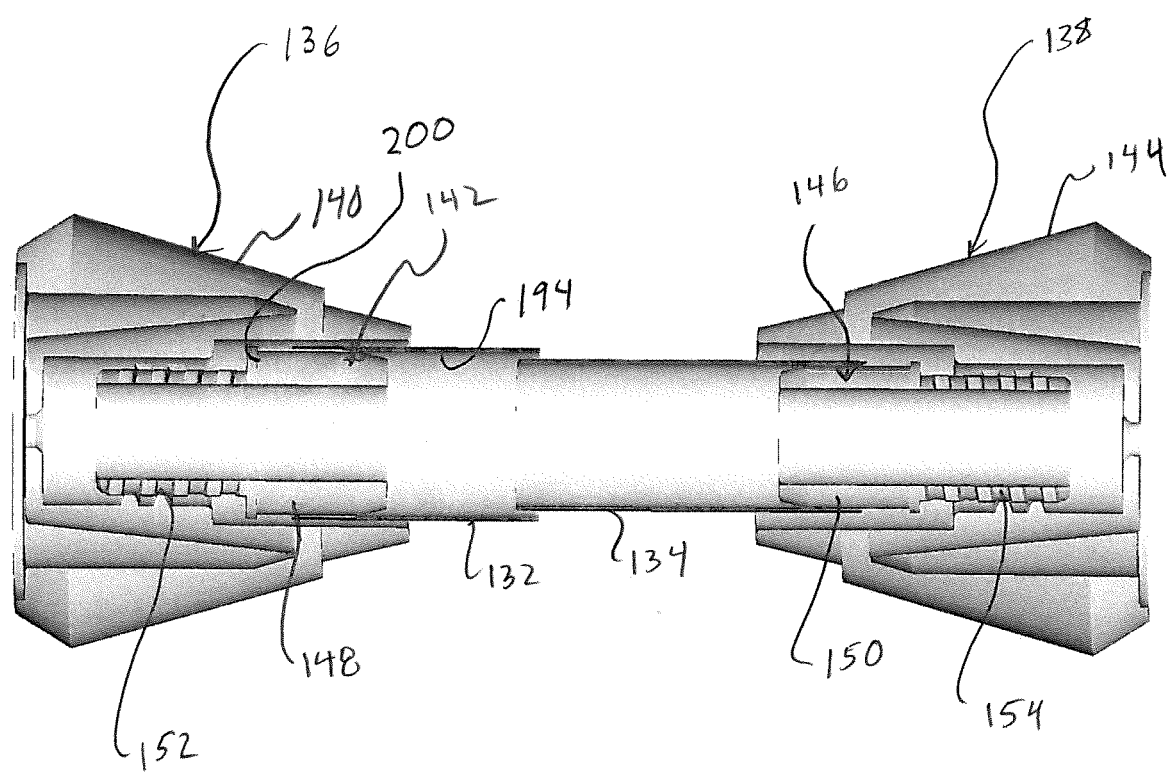
FIG. 13 is a central cross-section view of the end cap system of FIG. 12.

With reference to FIG. 13, the left end cap assembly 136 includes a left end cap 140 and an outer rod insert 142. The right end cap assembly 138 similarly includes a right end cap 144 and an inner rod insert 146. The outer and inner rod inserts 142, 146 each include a first portion 148, 150 that is received in one end of the outer and inner rods 132, 134, respectively, and a second portion 152, 154 that has a threaded engagement with its respective left and right end cap 140, 144. The threading is such that the outer and inner rods 132, 134 only need to be turned together in one direction to advance the end caps 140, 144 outward relative to the outer and inner rods 132, 134 to further secure the adjustable rod 130 between two opposing mounting surfaces.

Figure 14:
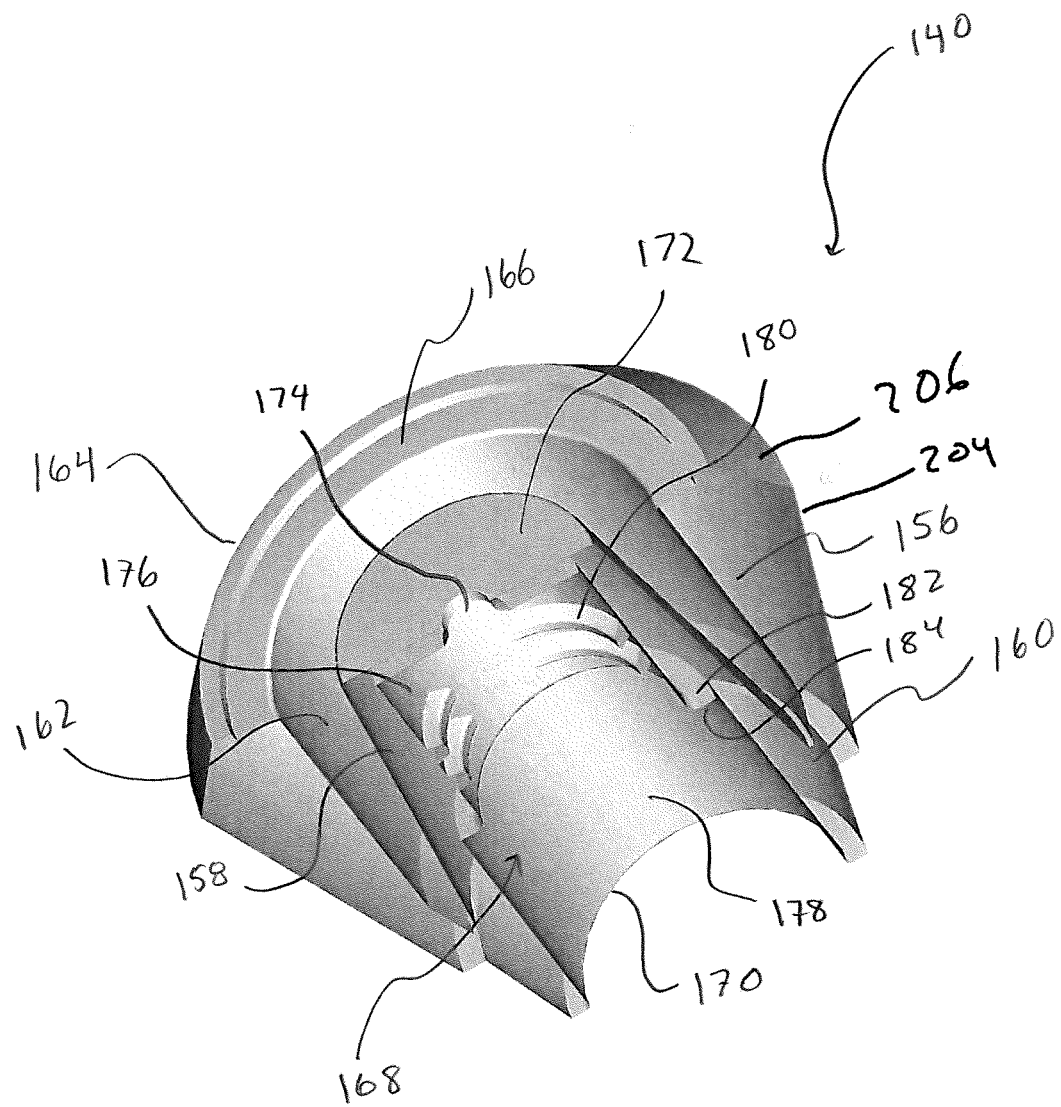
FIG. 14 is a central cross-section view of a left end cap of the end cap system of FIG. 12.
Figure 15:
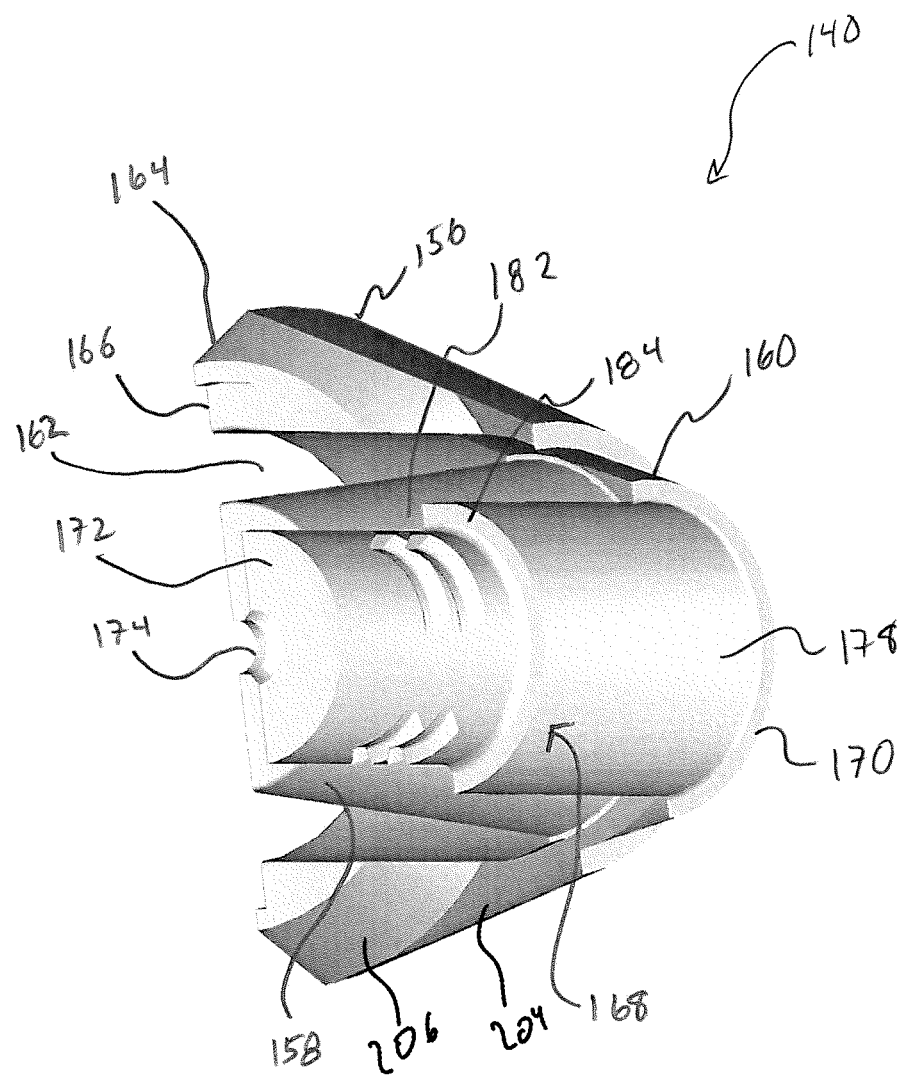
FIG. 15 is another central cross-section view of the left end cap of FIG. 14.

With respect to FIGS. 14 and 15, the left end cap 140 includes an outer annular body 156 and an inner annular body 158 interconnected at an inboard end 160 of the bodies 156, 158 and forming a space 162 between the bodies 156, 158. As shown, the bodies 156, 158 include walls that angle away from one another from the inboard end 160 to an outboard end 164 such that the space 162 formed between the bodies 156, 158 has a generally V-shaped cross-section. The outer profile of the outer body 156 can be decorative or ornate. For example, as shown in FIGS. 14 and 15, the outer body 156 includes an inboard surface 204 and an outboard surface 206. The inboard surface 204 increases in diameter from the inboard end 160 toward an outboard end 164 until it transitions to the outboard surface 206. The outboard surface 206 decreases in diameter from the transition with the inboard surface 204 to the outboard end 164. The outer body 156 thus has a substantially diamond cross-sectional shape.

The outboard end 164 of the outer annular body 156 defines an annular recess 166 that receives a mounting pad, such as mounting pad 102 of the end cap in FIG. 11. The mounting pad may be glued or welded into to the recess 166.

The inner annular body 158 defines a through passage 168 with an open end 170 and a closed end 172. The closed end 172 includes a hole 174 through which a fastener (such as a nail or screw) can extend to attach the left end cap 140 to a mounting surface. This makes the left end cap system 136 a dual mount assembly in that it can be mounted using the fastener or the threaded engagement or both. The passage 168 includes a threaded portion 176 and rod receiving portion 178 inward of the threaded portion 176. The threaded portion 176 includes threads 180 for engaging the second portion 152 of the outer rod insert 142. The threads 180 could be discontinuous threading. The threads 180 are left-handed threads. The rod receiving portion 178 has a larger inner diameter than the threaded portion 176.

A step 182 in the through passage 168 transitions between the threaded portion 176 and the rod receiving portion 178 of the body 158. An axially facing face 184 of the step 182 may engage an annular flange 186 of the outer rod insert 142 to stop further threaded insertion of the outer rod insert 142 into the inner annular body 158.

Figure 22:
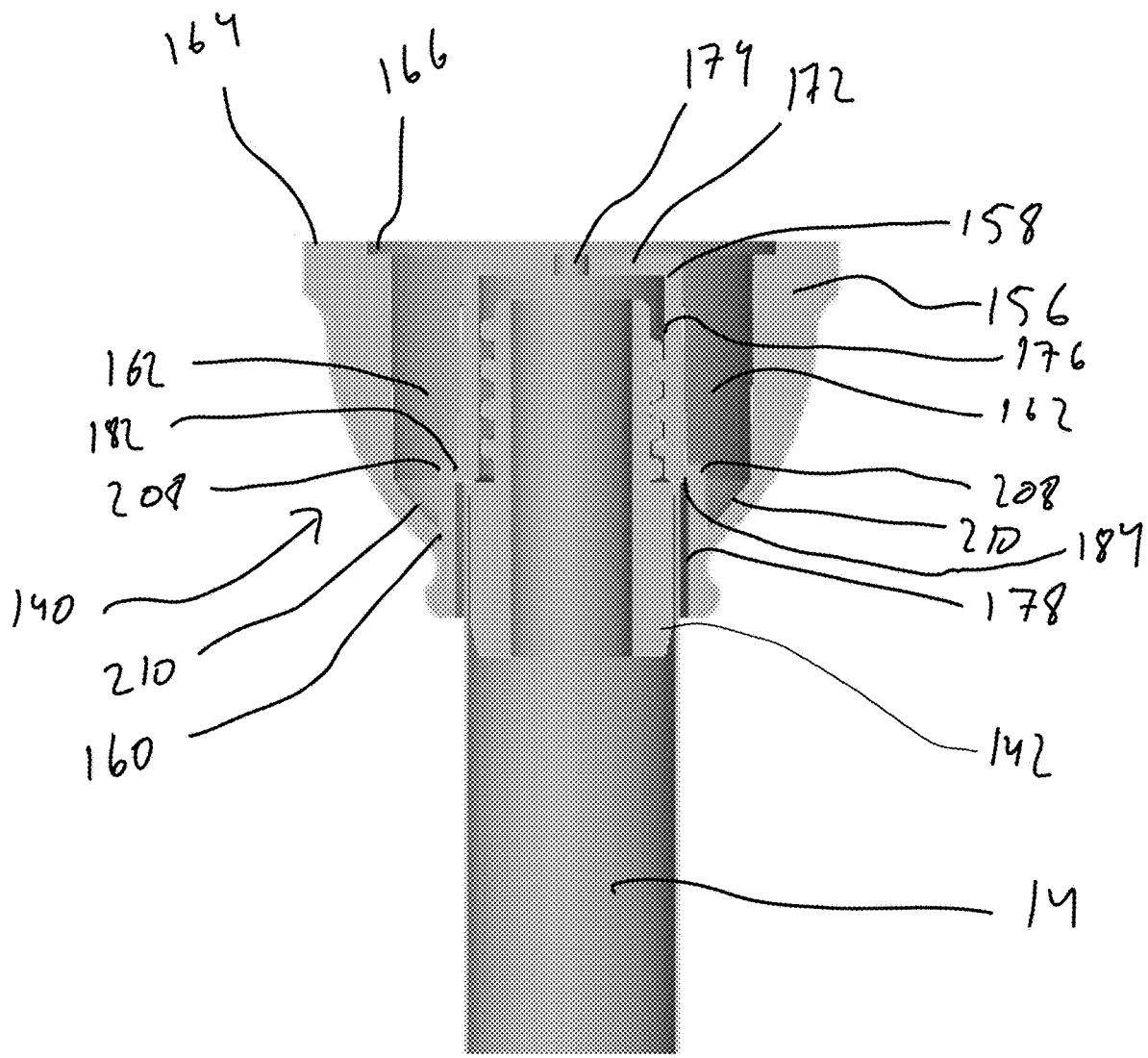
FIG. 22 is a cross-section view of a portion of an end cap system according to another embodiment.
Figure 23:
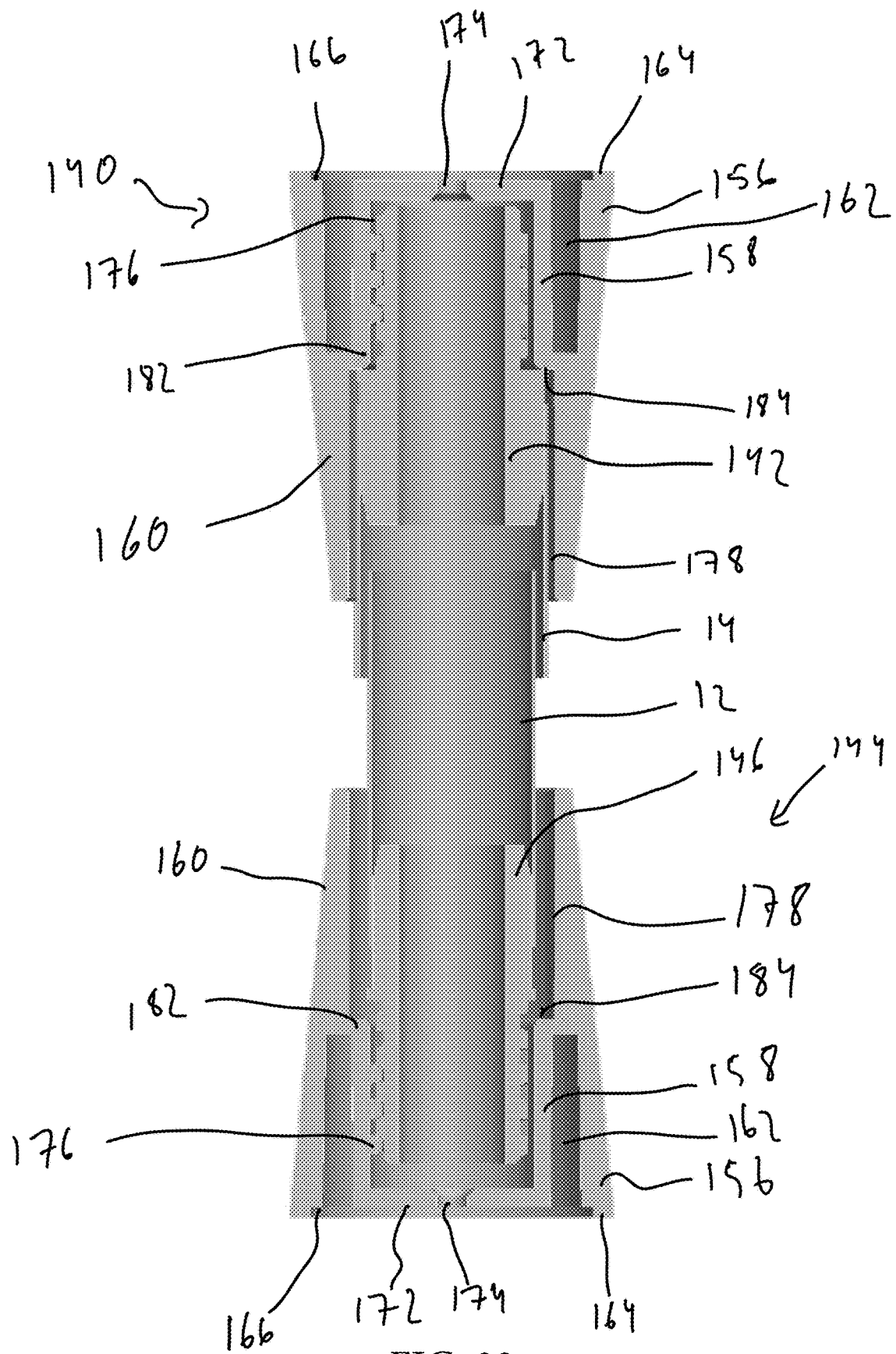
FIG. 23 is a cross-section view of an end cap system according to yet another embodiment.

In other embodiments, such as those shown in FIGS. 22 and 23, the outer profile of the outer body 156 and the space 162 between the bodies 156, 158 may have different configurations. The embodiments shown in FIGS. 22 and 23 are similar to the end cap assemblies 136, 138 of FIG. 12 in all respects except for the outer profile of the bodies 156, 158 and the cross-sectional shape of space 162 formed in the bodies. For simplicity, the same reference numerals are used to indicate the features that correspond to similar features of the end cap assemblies 136, 138 of FIG. 12.

In FIG. 22, the outer body 156 is substantially bell-shaped. The inner annular body 158 is cylindrical and forms the threaded portion 176 and the rod receiving portion 178 which has a greater diameter than the threaded portion 176. The inner annular body 158 includes a step 208 extending into the space 162 formed between the bodies 156, 158 corresponding to the transition in diameter from the threaded portion 176 to the rod receiving portion 178. A portion of the outer annular body 156 defining the space 162 is substantially parallel to the threaded portion 176 of the inner annular body 158. The outer annular body 156 further includes a curved or arcuate cross-sectional surface 210 within the space 162 that corresponds to a portion of the bell-shaped profile of the outer body 156 extending from the substantially parallel portion to the rod receiving portion 178 of the inner annular body 158. The outer body at the other end of a rod assembly may be same as outer body 156 but may be sized to accommodate a rod of different diameter. For example, if the other rod is rod 12, which is the inner rod, then the diameters of the threaded portion 176 and the rod receiving portion 178 may be smaller.

In FIG. 23, the outer body 156 is cone-shaped. The bodies 156,158 defining the space 162 extend substantially parallel to one another such that the space 162 formed between the bodies 156, 158 has a rectangular cross-section. The cross-sectional shapes of the space 162 between the outer annular body 156 and the inner annular body 158 of the end caps 140 of FIGS. 14-15, 22 and 23 are given by way of example and may have other cross-sectional shapes. For example, the outer annular body 156 and inner annular body 158 may be joined together at the inboard end 160 to form an arcuate or rounded cross-sectional shape at the inboard end 160 of the space 162.

Figure 16:
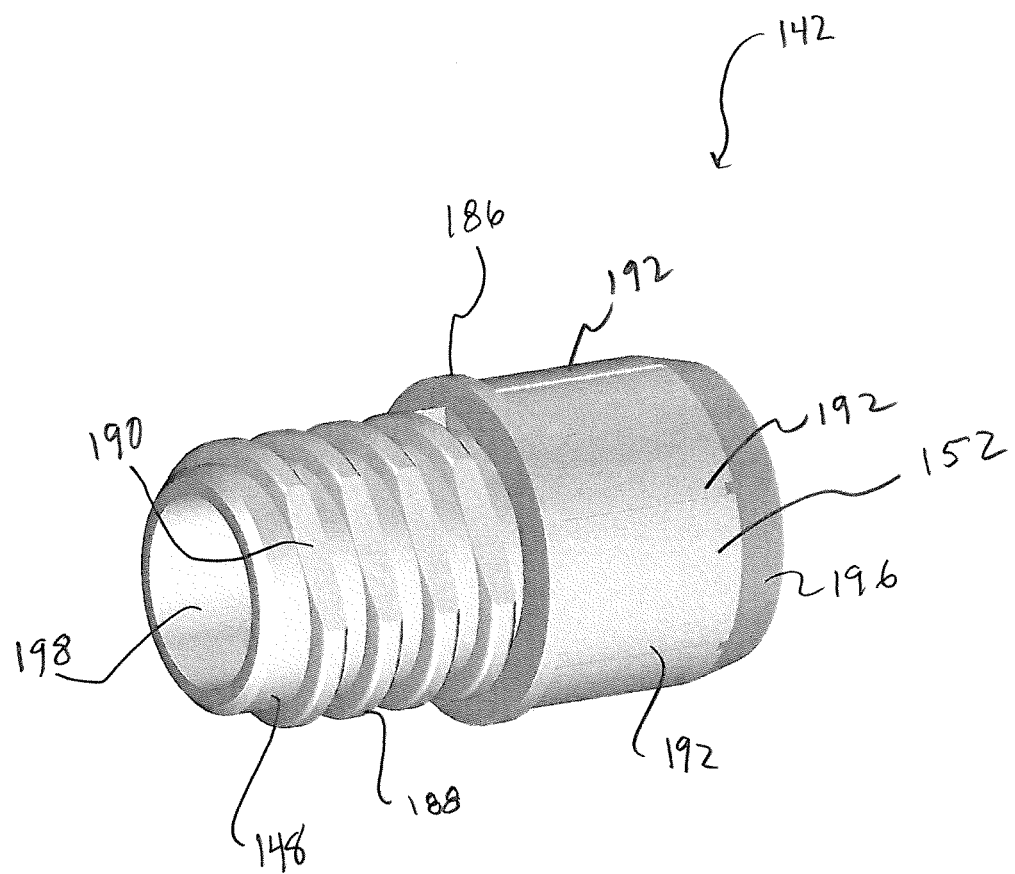
FIG. 16 is a perspective view of a left rod insert of the end cap system of FIG. 12.
Figure 17:
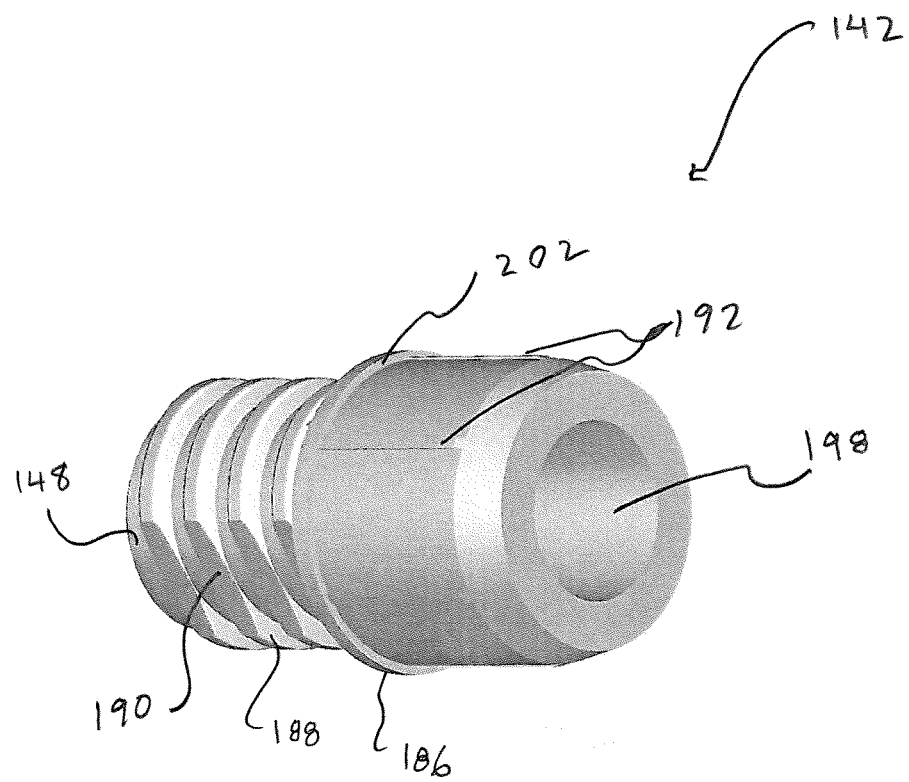
FIG. 17 is another perspective view of the left rod insert of FIG. 16.

Referring to FIGS. 16 and 17, there is illustrated the outer rod insert 142. The first portion 148 of the outer rod 142 insert includes threading 188 which is left-handed threading that complements the threading 180 of the threaded portion 176 of the left end cap 140. The threading 188 can be discontinuous threading and/or includes flats 190. The second portion 152 of the outer rod insert 142 includes axially extending ribs 192. The ribs 192 engage an inner surface 194 (FIG. 13) of the outer rod 132 with a tight friction fit with such that the two are securely connected to one another. The second portion 152 includes a chamfered end 196 that helps to insert the second portion 152 into an end 200 (FIG. 13) of the outer rod 132. The outer rod insert 142 can be hollow and/or include a through passage 198. The annular flange 186 includes a face 202 that engages the end 200 of the outer rod 132.

Figure 18:
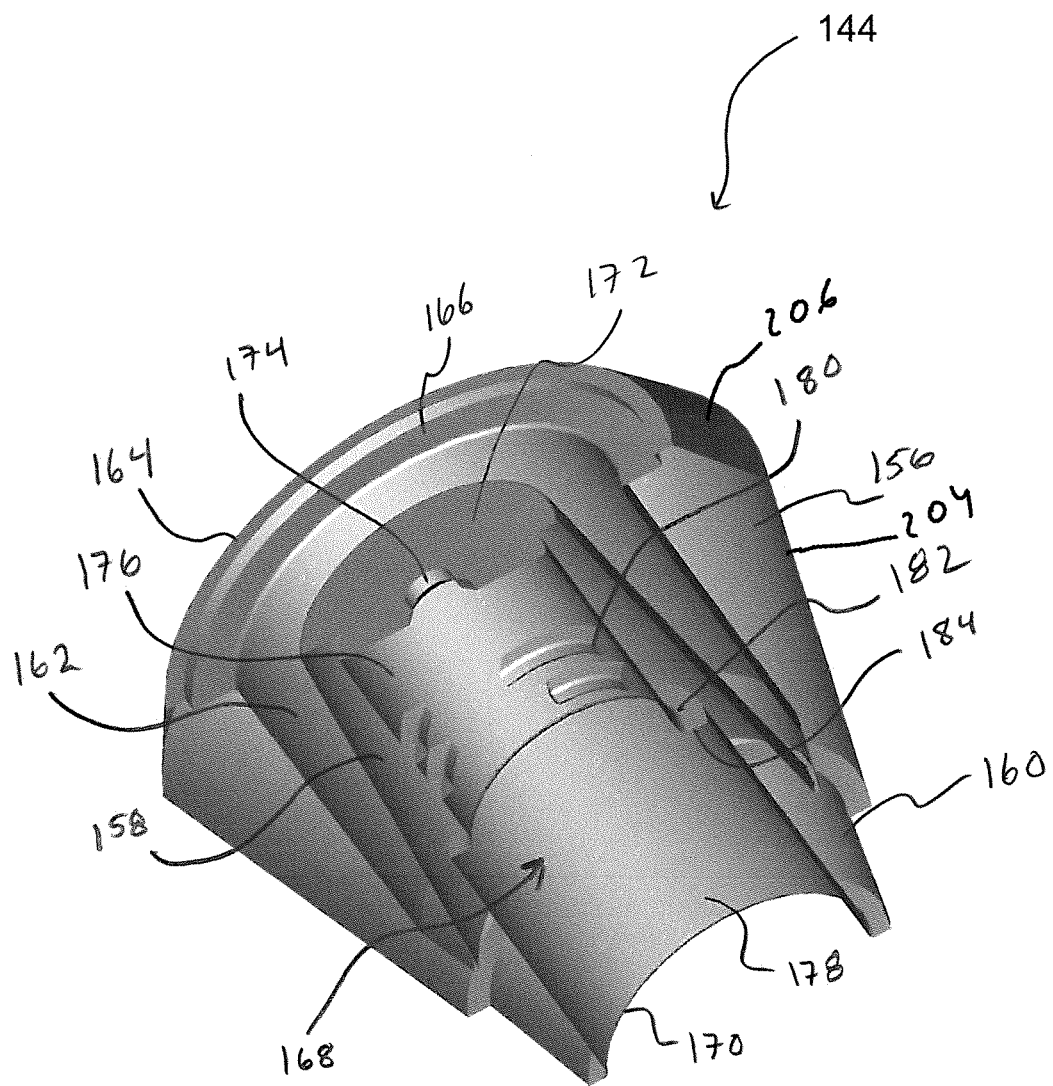
FIG. 18 is a central cross-section view a right end cap of the end cap system of FIG. 12.
Figure 19:
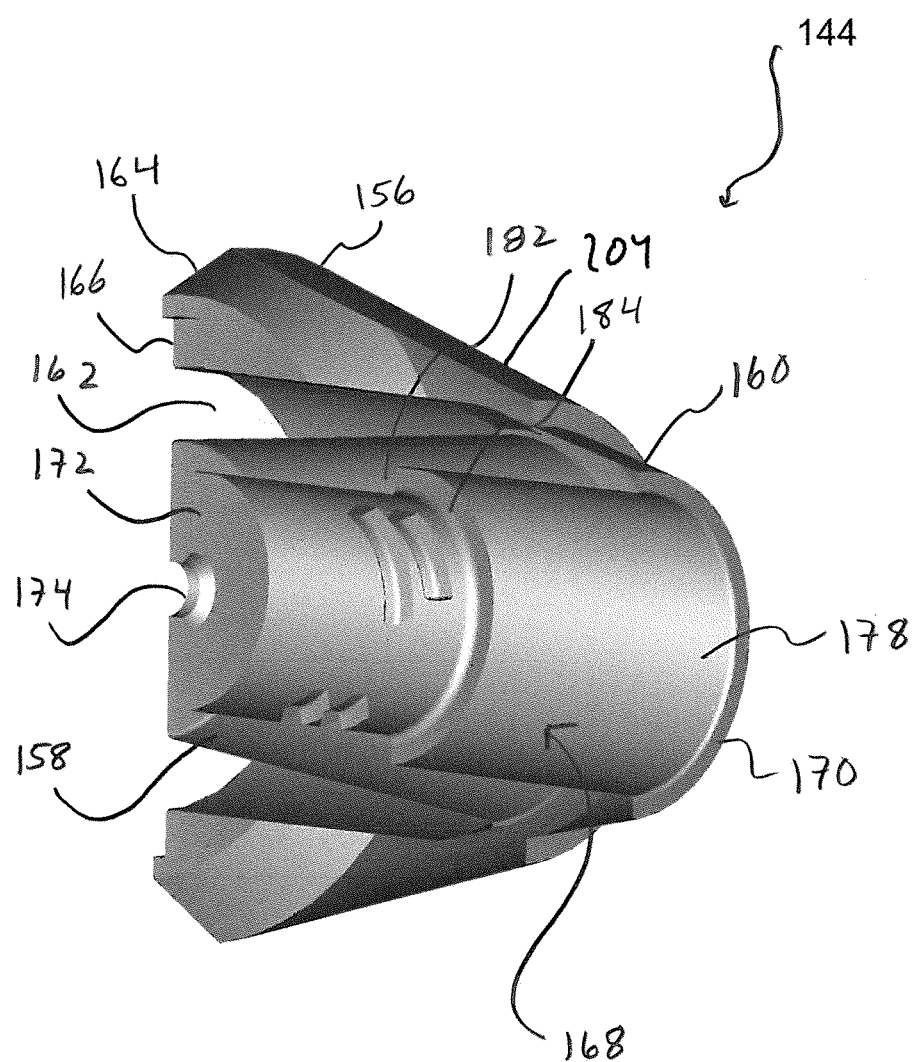
FIG. 19 another central cross-section view of the right end cap of FIG. 18.

Referring to FIGS. 18 and 19, the right end cap 144 is the same as the left end cap 140 except for one noteworthy difference. The difference is that the threading 180 is right-handed threading. This is the opposite of that for the left end cap 140 so that the rods 132, 134 can be turned in the same direction to activate the left end cap system 136 and the right end cap system 138 at the same time. The same reference numerals are applied to the figures for the right end cap 144 as for the left end cap 140.

Figure 20:
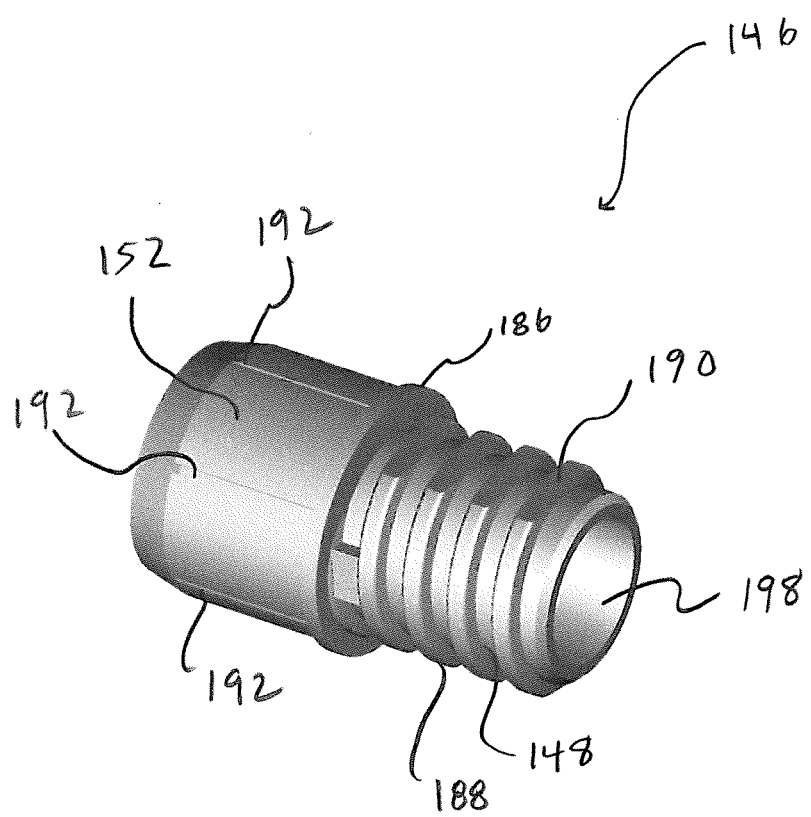
FIG. 20 is a perspective view of a right rod insert of the end cap system of FIG. 12.
Figure 21:
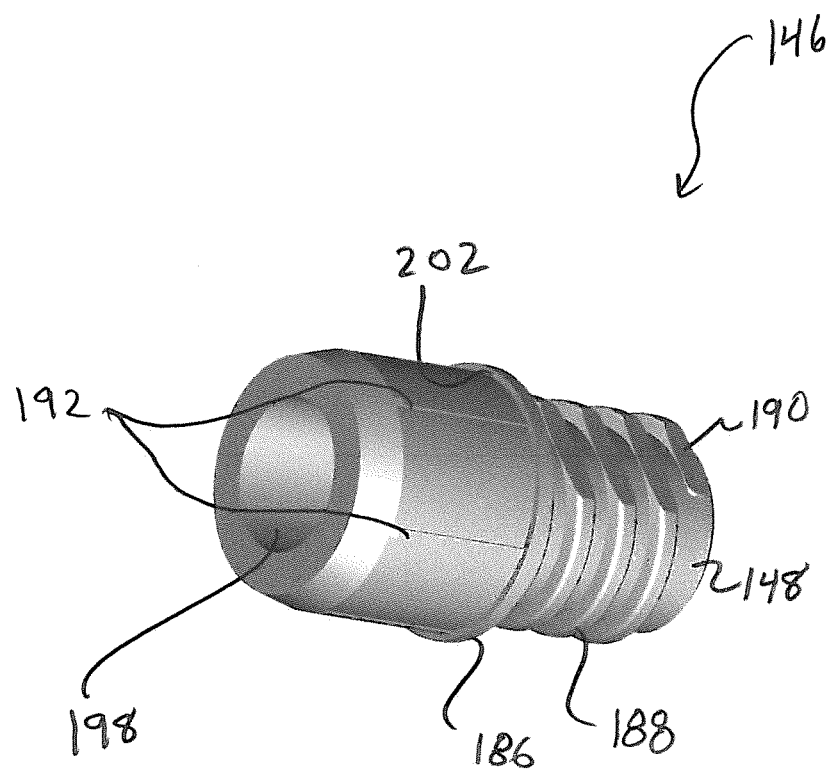
FIG. 21 is another perspective view of the right rod insert of FIG. 20.

Referring to FIGS. 20-21, the inner rod insert 146 is the same as the outer rod insert 142 except for two main differences. First, the outer diameter of the second portion 154 of the inner rod insert 146 is smaller than the outer diameter of the second portion 152 of the outer rod insert 142 because the second portion 154 fits in the smaller inner diameter of the inner rod 134. Second, the threading 180 is right-handed threading. The same reference numerals are applied to the figures for the inner rod insert 146 as for the outer rod insert 142.

The left-handed threading of the left end cap assembly 136 and the right-handed threading of the right end cap assembly 138 enable the outer and inner rods 132, 134 to be turned in the same direction to activate the assemblies 136, 138. For example, with the outer rod to one's left and inner rod to one's right, the outer and inner rods 132, 134 can be turned toward one's body to extend the end caps 140, 144 away from the outer and inner rods 132, 134, respectively. In other words, the rods 132, 134 can be turned clockwise with respect to the right end cap assembly 138. The rods can be turned away from one's body (i.e., counter-clockwise with respect to the right end cap assembly 138) to retract the end caps 140, 144.

The components of the lock mechanism and end cap systems may be made from plastic or metal or a combination of both.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the technological contribution.

What is claimed is:

1. An adjustable rod comprising:
   at least two rods that are adjustable relative to one another along a longitudinal axis;
   a lock engaging the at least two rods to selectively lock the at least two rods relative to one another;
   a first end cap defining a socket, the socket having a bottom wall and a sidewall, the sidewall having a non-threaded portion, a first threaded portion outboard of the non-threaded portion having internal threading in the socket, the bottom wall being outboard of the first threaded portion; and
   a first rod insert having an insertion portion and a second threaded portion, the insertion portion being sized to be received in the first rod of the at least two rods with a friction fit, and the second threaded portion sized to extend beyond the first rod, the second threaded portion having external threading that mates with the internal threading such that rotation of the first end cap relative to the first rod moves the first end cap longitudinally relative to the first rod.

2. The adjustable rod of claim 1 wherein the bottom wall defining a mounting opening for receiving a mounting fastener.

3. The adjustable rod of claim 2 wherein the mounting fastener is sized to extend through the mounting opening and includes an enlarged portion that engages the bottom wall around the mounting opening.

4. The adjustable rod of claim 1 wherein the insertion portion of the first rod insert is within the first rod and the second threaded portion extends from the first rod.

5. The adjustable rod of claim 4 wherein a flange of the first rod insert disposed between the insertion portion and the second threaded portion engages the first rod to limit insertion of the first rod insert into the first rod.

6. The adjustable rod of claim 1 wherein the socket of the first end cap includes a rod receiving portion and the first rod is extended into the rod receiving portion.

7. The adjustable rod of claim 6 wherein the socket includes a step between the first threaded portion and the rod receiving portion.

8. The adjustable rod of claim 1 wherein the sidewall extends away from the bottom wall to define the socket.

9. The adjustable rod of claim 1 wherein the first end cap includes an outer body surrounding at least a portion of the sidewall.

10. The adjustable rod of claim 1 wherein the insertion portion includes radial projections engaging the first rod in the friction fit.

11. The adjustable rod of claim 1 further comprising a second endcap and a second rod insert, the second rod insert connecting the second endcap and a second rod of the at least two rods.

12. An adjustable rod comprising:
    at least two rods that are adjustable relative to one another along a longitudinal axis;
    a lock engaging the at least two rods such that rotation of the at least two rods relative to one another locks the at least two rods relative to one another;
    a first end cap defining a first mounting hole used to mount the first end cap to a first structure and defining a first socket about the first mounting hole and sized to receive an end portion of a first rod of the at least two rods and to permit the end portion of the first rod to rotate as the first rod is rotated to lock the at least two rods with the lock; the first socket having a first bottom wall and a first sidewall, the first sidewall having a non-threaded portion, a first threaded portion outboard of the non-threaded portion having internal threading in the first socket, the first bottom wall being outboard of the first threaded portion; and
    a first fastener sized to extend through the first mounting hole to mount the first end cap to the first structure.

13. The adjustable rod of claim 12 wherein the first bottom wall defines the first mounting hole.

14. The adjustable rod of claim 13 further comprising a second end cap defining a second mounting hole used to mount the second end cap to a second structure and defining a second socket sized to receive an end portion of a second rod of the at least two rods and to permit the end portion of the second rod to rotate as the second rod is rotated to lock the at least two rods with the lock, and a second fastener sized to extend through the second mounting hole to mount the second end cap to the second structure.

15. The adjustable rod of claim 14 wherein the second end cap includes a second sidewall and a second bottom wall defining the second socket and the second bottom wall defining the second mounting hole.

16. The adjustable rod of claim 12 wherein the lock expands as the at least two rods are rotated relative to one another.

17. The adjustable rod of claim 16 wherein the lock includes a fixed wedge and a movable wedge that expands as the movable wedge engages the fixed wedge upon rotation of the at least two rods relative to one another.

* * * * *